United States Patent
Elie et al.

(10) Patent No.: US 11,982,119 B2
(45) Date of Patent: May 14, 2024

(54) AUTOMOTIVE DOOR POWER ASSIST

(71) Applicant: Ford Global Technologies, LLC, Dearborn, MI (US)

(72) Inventors: Larry Dean Elie, Ypsilanti, MI (US); Timothy J. Potter, Dearborn, MI (US); Robert F. Novak, Farmington Hills, MI (US); John Wayne Jaranson, Dearborn, MI (US); Jeff A. Wallace, Walled Lake, MI (US); Michael M. Azzouz, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 603 days.

(21) Appl. No.: 17/221,070

(22) Filed: Apr. 2, 2021

(65) Prior Publication Data
US 2021/0222474 A1    Jul. 22, 2021

Related U.S. Application Data

(60) Division of application No. 15/968,055, filed on May 1, 2018, now Pat. No. 10,995,535, which is a division
(Continued)

(51) Int. Cl.
*E05F 15/00*     (2015.01)
*B60J 5/04*      (2006.01)
(Continued)

(52) U.S. Cl.
CPC ............... *E05F 15/00* (2013.01); *B60J 5/047* (2013.01); *E05B 81/14* (2013.01); *E05B 81/20* (2013.01);
(Continued)

(58) Field of Classification Search
None
See application file for complete search history.

(56) References Cited

U.S. PATENT DOCUMENTS

| 2,721,353 A | 10/1955 | Mackintosh |
| 2,915,777 A | 12/1959 | Allen |

(Continued)

FOREIGN PATENT DOCUMENTS

| CA | 2034320 C | 11/1994 |
| CN | 101403271 A | 4/2009 |

(Continued)

OTHER PUBLICATIONS

Steeven Zeiß, Alexander Marinc, Andreas Braun, Tobias Große-Puppendahl, Sebastian Beck; "A Gesture-based Door Control Using Capacitive Sensors"; Fraunhofer-Institut für Graphische Datenverarbeitung IGD; pp. 1-10; date unknown.
(Continued)

*Primary Examiner* — Joseph D. Pape
(74) *Attorney, Agent, or Firm* — Vichit Chea; Price Heneveld LLP

(57) ABSTRACT

An automated door system includes a door pivotally coupled to a vehicle body at a hinge axis defined by at least one hinge assembly. A power assist device is coupled to the hinge assembly and further coupled to the door. The power assist device is configured to slow movement of the door along a door swing path from an initial velocity to a slow close velocity when the initial velocity exceeds a predetermined threshold velocity, thereby providing a slow and controlled close when a user attempts to slam the door. The power assist device is further configured to power opening and closing movement of the door as initiated by a user.

3 Claims, 19 Drawing Sheets

Related U.S. Application Data of application No. 15/804,527, filed on Nov. 6, 2017, now Pat. No. 10,626,657, which is a continuation of application No. 14/812,201, filed on Jul. 29, 2015, now Pat. No. 9,834,974.

(51) Int. Cl.

| | | |
|---|---|---|
| *E05B 81/14* | (2014.01) | |
| *E05B 81/20* | (2014.01) | |
| *E05F 15/614* | (2015.01) | |
| *E05F 15/70* | (2015.01) | |
| *E05B 15/04* | (2006.01) | |
| *E05B 79/20* | (2014.01) | |
| *E05B 81/06* | (2014.01) | |

(52) U.S. Cl.
CPC ............ *E05F 15/614* (2015.01); *E05F 15/70* (2015.01); *E05B 15/04* (2013.01); *E05B 79/20* (2013.01); *E05B 81/06* (2013.01); *E05Y 2900/531* (2013.01)

(56) References Cited

U.S. PATENT DOCUMENTS

| | | | |
|---|---|---|---|
| 3,344,554 A | 10/1967 | Misaka et al. | |
| 3,357,137 A | 12/1967 | Lombardi et al. | |
| 3,895,281 A | 7/1975 | Corbaz | |
| 4,078,770 A | 3/1978 | Yates et al. | |
| 4,121,382 A | 10/1978 | Dietrich et al. | |
| 4,143,497 A | 3/1979 | Offenbacher | |
| 4,386,398 A | 5/1983 | Matsuoka et al. | |
| 4,441,376 A | 4/1984 | Tobey | |
| 4,488,753 A | 12/1984 | Koike | |
| 4,497,137 A | 2/1985 | Nelson | |
| 4,501,012 A | 2/1985 | Kishi et al. | |
| 4,501,090 A | 2/1985 | Yoshida et al. | |
| 4,674,230 A | 6/1987 | Takeo et al. | |
| 4,727,679 A | 3/1988 | Kornbrekke et al. | |
| 4,763,111 A | 8/1988 | Matsuo et al. | |
| 4,899,945 A | 2/1990 | Jones | |
| 4,952,080 A | 8/1990 | Boiucaner et al. | |
| 5,236,234 A | 8/1993 | Norman | |
| 5,317,835 A | 6/1994 | Dupuy et al. | |
| 5,355,628 A | 10/1994 | Dranchak | |
| 5,369,911 A | 12/1994 | Fortunato | |
| 5,396,158 A | 3/1995 | Long et al. | |
| 5,434,487 A | 7/1995 | Long et al. | |
| 5,468,042 A | 11/1995 | Heinrich | |
| 5,787,636 A | 8/1998 | Buchanan, Jr. | |
| 5,801,340 A | 9/1998 | Peter | |
| 5,913,763 A | 6/1999 | Beran et al. | |
| 6,065,185 A | 5/2000 | Breed et al. | |
| 6,145,354 A | 11/2000 | Kondo et al. | |
| 6,247,271 B1 | 6/2001 | Fioritto et al. | |
| 6,275,231 B1 | 8/2001 | Obradovich | |
| 6,305,737 B1 | 10/2001 | Corder et al. | |
| 6,341,807 B2 | 1/2002 | Cetnar et al. | |
| 6,370,732 B1 | 4/2002 | Yezersky et al. | |
| 6,401,392 B1 | 6/2002 | Yuge | |
| 6,435,575 B1 | 8/2002 | Pajak et al. | |
| 6,442,902 B1 | 9/2002 | Van Den Oord | |
| 6,498,970 B2 | 12/2002 | Colmenarez et al. | |
| 6,624,605 B1 | 9/2003 | Powder et al. | |
| 6,777,958 B2 | 8/2004 | Haag et al. | |
| 6,928,694 B2 | 8/2005 | Breed et al. | |
| 7,034,682 B2 | 4/2006 | Beggs et al. | |
| 7,045,764 B2 | 5/2006 | Beggs et al. | |
| 7,068,146 B2 | 6/2006 | Sasaki et al. | |
| 7,132,642 B2 | 11/2006 | Shank et al. | |
| 7,175,227 B2 | 2/2007 | Menard | |
| 7,193,509 B2 | 3/2007 | Bartels et al. | |
| 7,215,529 B2 | 5/2007 | Rosenau | |
| 7,273,207 B2 | 9/2007 | Studer | |
| 7,280,035 B2 | 10/2007 | McLain et al. | |
| 7,320,497 B2 | 1/2008 | Zinn et al. | |
| 7,342,373 B2 | 3/2008 | Newman et al. | |
| 7,377,557 B2 | 5/2008 | Shelley et al. | |
| 7,400,153 B2 | 7/2008 | Shoji et al. | |
| 7,438,346 B1 | 10/2008 | Breed | |
| 7,439,632 B2 | 10/2008 | Ogino et al. | |
| 7,538,506 B2 | 5/2009 | Zinn et al. | |
| 7,540,554 B2 | 6/2009 | Bals | |
| 7,686,378 B2 * | 3/2010 | Gisler ............... E05F 15/43 296/146.4 |
| 7,688,179 B2 | 3/2010 | Kurpinski et al. | |
| 7,726,722 B2 * | 6/2010 | Ray .................. E05F 15/70 296/146.4 |
| 7,874,609 B2 | 1/2011 | Whinnery | |
| 7,886,409 B2 | 2/2011 | Yip | |
| 8,077,022 B2 | 12/2011 | Baruco et al. | |
| 8,132,844 B2 | 3/2012 | Sonnek et al. | |
| 8,159,231 B2 | 4/2012 | Sakamaki | |
| 8,169,317 B2 | 5/2012 | Lemerand et al. | |
| 8,186,013 B2 | 5/2012 | Yip | |
| 8,234,817 B2 * | 8/2012 | Neundorf ............. E05F 15/63 49/28 |
| 8,237,544 B2 | 8/2012 | Nakashima | |
| 8,284,022 B2 | 10/2012 | Kachouh | |
| 8,397,581 B2 | 3/2013 | Ruby, III et al. | |
| 8,511,739 B2 | 8/2013 | Brown et al. | |
| 8,615,927 B2 | 12/2013 | Ezzat et al. | |
| 8,641,125 B2 | 2/2014 | Jimenez et al. | |
| 8,651,461 B2 | 2/2014 | Christensen et al. | |
| 9,353,566 B2 * | 5/2016 | Miu .................. B60J 5/0472 |
| 2001/0004164 A1 | 6/2001 | Mattsson | |
| 2002/0039008 A1 | 4/2002 | Edgar et al. | |
| 2003/0038544 A1 | 2/2003 | Spurr | |
| 2003/0222758 A1 | 12/2003 | Willats et al. | |
| 2005/0174077 A1 | 8/2005 | Haag et al. | |
| 2005/0242618 A1 | 11/2005 | Menard | |
| 2005/0280284 A1 | 12/2005 | McLain et al. | |
| 2006/0230574 A1 | 10/2006 | Murayama et al. | |
| 2007/0090654 A1 | 4/2007 | Eaton | |
| 2007/0186480 A1 | 8/2007 | Freeman | |
| 2007/0192038 A1 | 8/2007 | Kameyama | |
| 2008/0211519 A1 | 9/2008 | Kurumado et al. | |
| 2008/0295408 A1 | 12/2008 | Heissler | |
| 2008/0296927 A1 | 12/2008 | Gisler et al. | |
| 2009/0113797 A1 | 5/2009 | Hoermann | |
| 2009/0153151 A1 | 6/2009 | Cho et al. | |
| 2010/0224117 A1 | 9/2010 | Christensen et al. | |
| 2010/0242363 A1 | 9/2010 | Hirota | |
| 2011/0203181 A1 | 8/2011 | Magner et al. | |
| 2011/0260848 A1 | 10/2011 | Rodriguez Barros et al. | |
| 2011/0295469 A1 | 12/2011 | Rafii et al. | |
| 2012/0042572 A1 | 2/2012 | Yuge | |
| 2012/0179336 A1 | 7/2012 | Oakley | |
| 2013/0031747 A1 | 2/2013 | Gobart et al. | |
| 2013/0074412 A1 | 3/2013 | Wellborn et al. | |
| 2013/0091768 A1 | 4/2013 | Houser et al. | |
| 2013/0127479 A1 | 5/2013 | Grills et al. | |
| 2013/0138303 A1 | 5/2013 | McKee et al. | |
| 2014/0000165 A1 | 1/2014 | Patel et al. | |
| 2014/0055349 A1 | 2/2014 | Itoh | |
| 2014/0150581 A1 | 6/2014 | Scheuring et al. | |
| 2014/0297060 A1 | 10/2014 | Schmidt et al. | |
| 2014/0373454 A1 | 12/2014 | Sasaki | |
| 2015/0096233 A1 | 4/2015 | Kojima | |

FOREIGN PATENT DOCUMENTS

| | | |
|---|---|---|
| CN | 201343938 Y | 11/2009 |
| CN | 202294674 U | 7/2012 |
| CN | 103132847 A | 6/2013 |
| CN | 103269914 A | 8/2013 |
| CN | 203143980 U | 8/2013 |
| CN | 103422764 A | 12/2013 |
| CN | 203551964 U | 4/2014 |
| CN | 203580775 U | 5/2014 |
| DE | 4119579 A1 | 12/1992 |
| DE | 4207706 A1 | 9/1993 |
| DE | 10004161 A1 | 8/2001 |
| DE | 10038803 A1 | 2/2002 |

(56) References Cited

FOREIGN PATENT DOCUMENTS

| | | |
|---|---|---|
| DE | 102007062473 A1 | 7/2009 |
| EP | 0397300 A2 | 11/1990 |
| EP | 2174814 A2 | 4/2010 |
| EP | 1265772 A1 | 12/2010 |
| EP | 2287430 A2 | 2/2011 |
| EP | 1899565 B1 | 10/2011 |
| EP | 2583848 A2 | 4/2013 |
| EP | 2765112 A1 | 8/2014 |
| FR | 2873074 A1 | 1/2006 |
| JP | 07285789 A | 10/1995 |
| JP | 2000080828 A | 3/2000 |
| JP | 2000318444 A | 11/2000 |
| JP | 2004176426 A | 6/2004 |
| JP | 2009161959 A | 7/2009 |
| JP | 20100095383 A | 4/2010 |
| JP | 2013007171 A | 1/2013 |
| JP | 2013028903 A | 2/2013 |
| JP | 2014129037 A | 7/2014 |
| JP | 2014148842 A | 8/2014 |
| KR | 20020048811 A | 6/2002 |
| KR | 20130068538 A | 6/2013 |
| WO | 20100098620 A2 | 9/2010 |
| WO | 2013013313 A1 | 1/2013 |
| WO | 2013074901 A2 | 5/2013 |

OTHER PUBLICATIONS

Abd Manan Bin Ahmad; "The Design and Development of a System for Controlling Automotive Functions using Speech Recognition"; Universiti Teknologi Malaysia; pp. 1-100; 2006.

Haleem, M.S.; "Voice Controlled Automation System"; IEEE International; Dept. of Electron. Eng., NED Univ. of Eng. & Technol.; Multitopic Conference; Print ISBN: 978-1-4244-2823-6; pp. 1-2; Dec. 23-24, 2008.

"InnoTrans 2014: Safety on Vehicle Doors with Non-Touch Detection System from Mayser"; Mayser Safety Technology; pp. 1-1; Aug. 4, 2014.

Bogdan Popa; "How BMW's Soft Close Doors Work"; Autoevolution; pp. 1-6; Aug. 18, 2012.

\* cited by examiner

AUTOMOTIVE DOOR POWER ASSIST

CROSS-REFERENCE TO RELATED APPLICATION

This application is a divisional of U.S. patent application Ser. No. 15/968,055, filed on May 1, 2018 entitled AUTOMOTIVE DOOR POWER ASSIST, which is a divisional of U.S. patent application Ser. No. 15/804,527, filed on Nov. 6, 2017, now U.S. Pat. No. 10,626,657 entitled AUTOMOTIVE DOOR POWER ASSIST, which is a continuation of U.S. patent application Ser. No. 14/812,201, filed on Jul. 29, 2015, now U.S. Pat. No. 9,834,974 entitled AUTOMOTIVE DOOR POWER ASSIST, the entire disclosure of which is hereby incorporated by reference.

FIELD OF THE INVENTION

The present invention generally relates to a device for use on an automotive vehicle door, and more particularly, to a power assist device for the vehicle door providing both opening and closing assistance for the door, as well as a slow close feature.

BACKGROUND OF THE INVENTION

Motor vehicle doors may include device(s) to assist in opening and closing a vehicle door. Device(s) may also include the ability to sense a nearby object that might be contacted when opening the vehicle door for ingress and egress. When opened, if the vehicle door swings fast enough or hits the object hard enough, damage to the door may be sustained. These devices sense the distance to the object, typically using a sensor(s) located on the exterior surface of the door, and determine if it is within the door's projected swing path. Known devices generally cannot overcome the momentum necessary to open and close a vehicle door at the hinge location of the door. Thus, a device is desired, wherein the door is opened and closed under the control of a power assistance device that is coupled to one or more hinges of the vehicle door, and further wherein the surrounding area in the path of the door swing is surveyed for clearance to open the door and for appropriate detent settings. A device having a confined overall package size is desired to carry out the power assist functionality within the standard confines of a vehicle door to vehicle body spacing.

SUMMARY OF THE INVENTION

One aspect of the present invention includes an automated door system having a door pivotally coupled to a vehicle body by at least one hinge assembly. The hinge assembly includes a moveable hinge portion coupled to the door and a fixed hinge portion coupled to the vehicle body at a hinge pillar. A bracket is coupled to the fixed hinge portion at a first end and further coupled to the door at a second end. A power assist device is coupled to the bracket at the first end of the bracket and further coupled to the fixed hinge portion of the hinge assembly through a drive shaft extending outwardly from the power assist device. A motor is disposed within the power assist device and configured to drive the drive shaft for providing opening and closing movement of the door from a hinge axis of the hinge assembly.

Another aspect of the present invention includes an automated door system having a door and a hinge assembly having first and second portions. The first portion of the hinge assembly is coupled to a vehicle body and the second portion is coupled to the door for pivoting movement therewith. A power assist device is coupled to the first portion of the hinge assembly and the door, and configured to power opening and closing movement of the door from a hinge axis of the door.

Yet another aspect of the present invention includes an automated door system having a door pivotally coupled to a vehicle body at a hinge axis defined by at least one hinge assembly. A power assist device is coupled to the hinge assembly and further coupled to the door. The power assist device is configured to slow movement of the door along a door swing path from an initial velocity to a slow close velocity when the initial velocity exceeds a predetermined threshold velocity.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
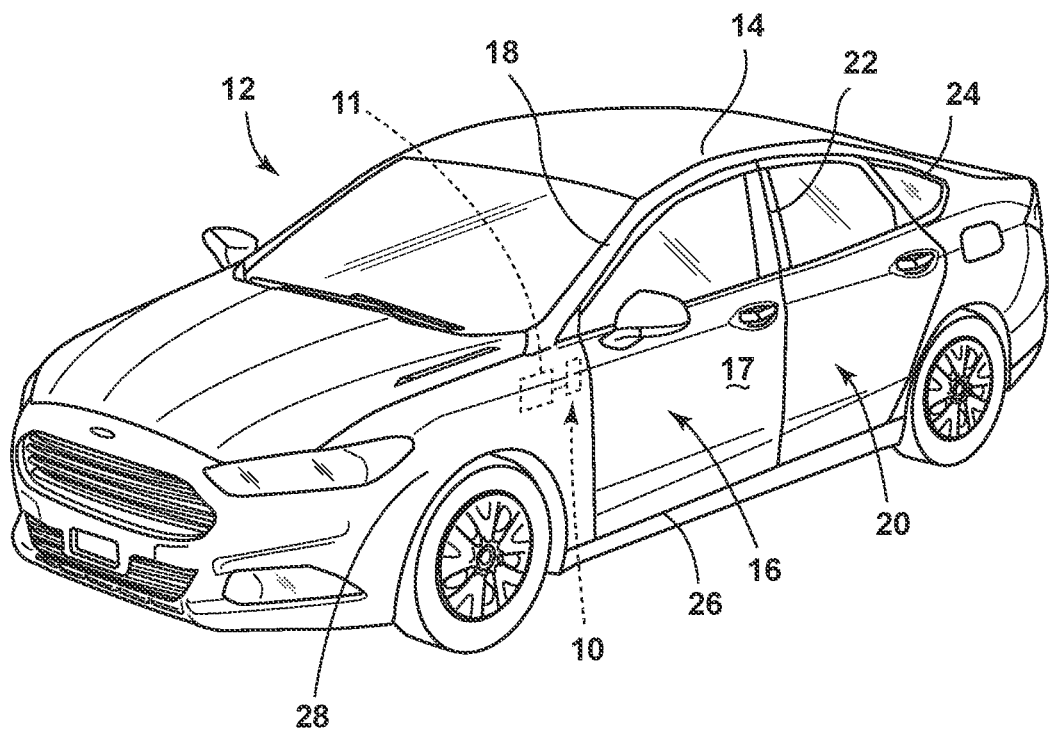
FIG. 1 is a perspective view of a vehicle having a driver's side door in a closed position with a power assist device coupled thereto according to an embodiment of the present invention.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a power assist device disposed on an exemplary motor vehicle 12. The motor vehicle 12 illustrated in FIG. 1 is an exemplary embodiment of an automotive vehicle or car having a vehicle body 14 upon which a door 16 is rotatably mounted. As shown in FIG. 1, the power assist device 10 is disposed adjacent to the door 16 and is operably and structurally coupled to the door 16 for assisting in moving the door 16 between open and closed positions, as further described below. Movement of the door 16 is controlled by a controller 11 which is configured to control the power assist device 10. The door 16 illustrated in FIG. 1 is a front side door, specifically a driver's side door; however, any vehicle door is contemplated for use with the power assist device 10 of the present concept. The door 16 is shown hinged to an A-pillar 18 of the vehicle body 14 by means of one or more hinges, as further described below. The door 16 includes an outer panel 17 and is shown in FIG. 1 in a closed position, wherein it is contemplated that the door 16 is latched to a B-pillar 22 of the vehicle body 14. The vehicle 12 further includes a rear door 20 which is hingedly coupled to the B-pillar 22 for latching to a C-pillar 24 in assembly. The vehicle body 14 further includes a rocker panel 26 and a front driver's side quarter panel 28, as shown in FIG. 1.

Figure 2:
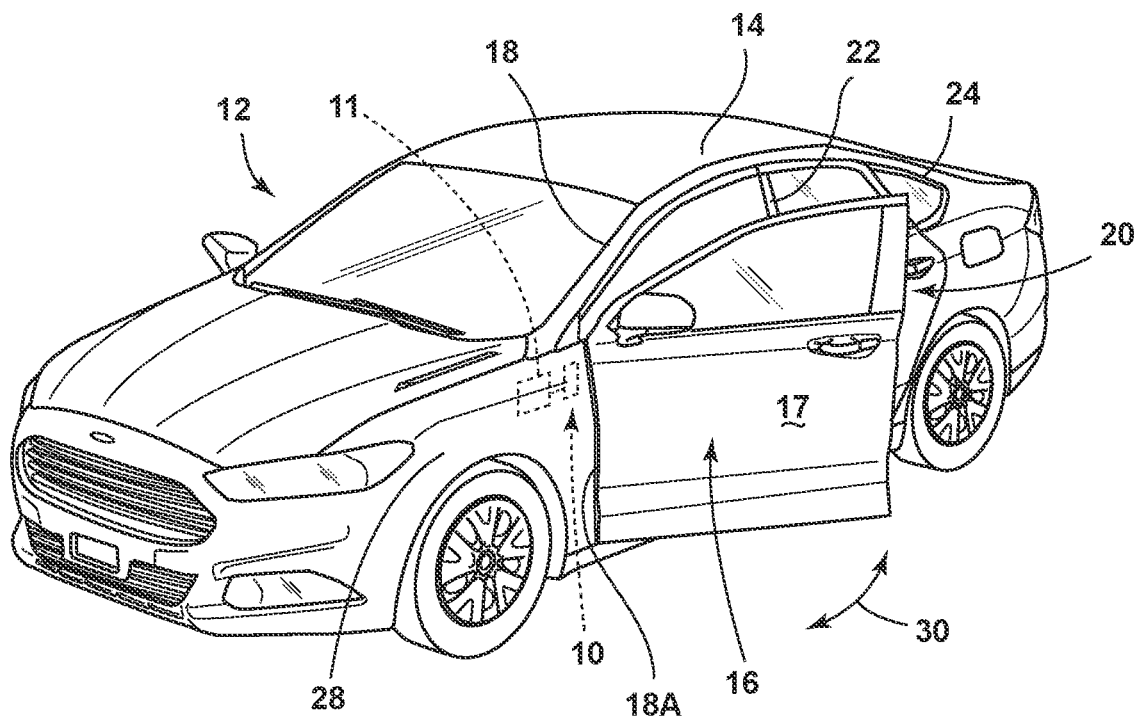
FIG. 2 is a perspective view of the vehicle of FIG. 1 with the driver's side door shown in an open position.

Referring now to FIG. 2, the door 16 is shown in an open position. The door 16 pivots or swings along a door swing path as indicated by arrow 30 between open and closed positions as hingedly coupled to a hinge-pillar 18A of the A-pillar 18. Movement of the door 16 between open (FIG. 2) and closed (FIG. 1) positions is contemplated to be optionally powered by the power assist device 10.

Figure 3:
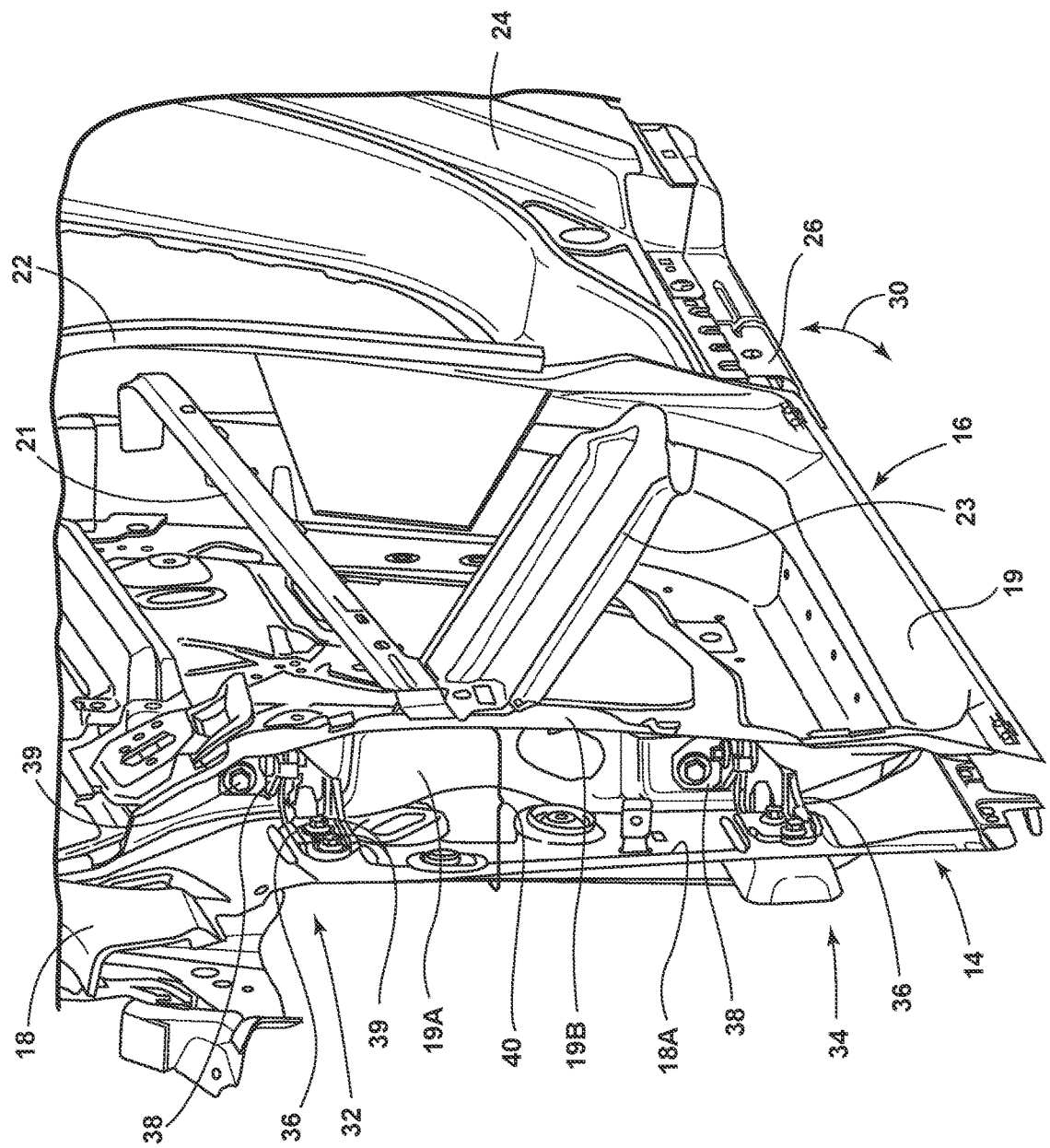
FIG. 3 is a fragmentary perspective view of a vehicle door with an outer panel removed to show a connection between an inner panel of the door and a hinge-pillar of the vehicle.

Referring now to FIG. 3, the door 16 is shown in the closed position with the outer panel 17 (FIGS. 1 and 2) removed to reveal upper and lower hinge assemblies 32, 34 coupled to an inner panel 19 of the door 16. The upper and lower hinge assemblies 32, 34 rotatably couple the door 16 to the vehicle body 14 at hinge-pillar 18A and are configured to carry the load of the door 16 as the door 16 moves between the open and closed positions. A door check (not shown) may also be used to help carry the load of the door 16, and is generally positioned between the upper and lower hinge assemblies 32, 34 along the inner panel 19. The upper and lower hinge assemblies 32, 34 are substantially similar having component parts which will be described herein using the same reference numerals for both the upper and lower hinge assemblies 32, 34. Specifically, the upper hinge assembly 32 is defined by a fixed hinge portion 36 and a moveable hinge portion 38. The fixed hinge portion 36 and the moveable hinge portion 38 are generally defined by brackets that pivotally couple the door 16 to the A-pillar 18. Specifically, the fixed hinge portion 36 is mounted to the A-pillar 18 at hinge-pillar 18A using fasteners 39, or other like coupling means. The moveable hinge portion 38 is rotatably mounted to the fixed hinge portion 36 by a hinge pin (identified and described below) which allows with the moveable hinge portion 38 to pivot with respect to the fixed hinge portion 36 as the door 16 opens and closes along the door swing path 30. The moveable hinge portion 38 is fixedly coupled to a sidewall 19A of the inner panel 19 by fastener 39.

As further indicated in FIG. 3 a package compartment 40 is defined by sidewall 19A and sidewall 19B of the inner door panel 19, as well as hinge-pillar 18A. As shown in FIG. 3, sidewall 19A is substantially perpendicular to sidewall 19B, and sidewall 19B is substantially parallel to hinge-pillar 18A. The package compartment 40 is generally closed off by a portion of the front quarter panel 28 (FIGS. 1 and 2) in assembly. As further shown in FIG. 3, the package compartment 40 defines a gap or space for mounting the power assist device 10, as further described below with reference to FIG. 4A. The volume of space defined by the package compartment 40 is limited and is generally at a premium in this location in most automotive vehicles. Thus, it is an object of the present concept to provide an effective power assist device that can properly fit within the confines of the package compartment 40 without modification to the existing structures defining the boundaries of the package compartment 40. As further shown in FIG. 3, the door 16 may also include one or more reinforcement belts 21, 23 for reinforcing the inner panel 19 from torque forces imparted by the power assist device 10 on the door 16.

Figure 4A:
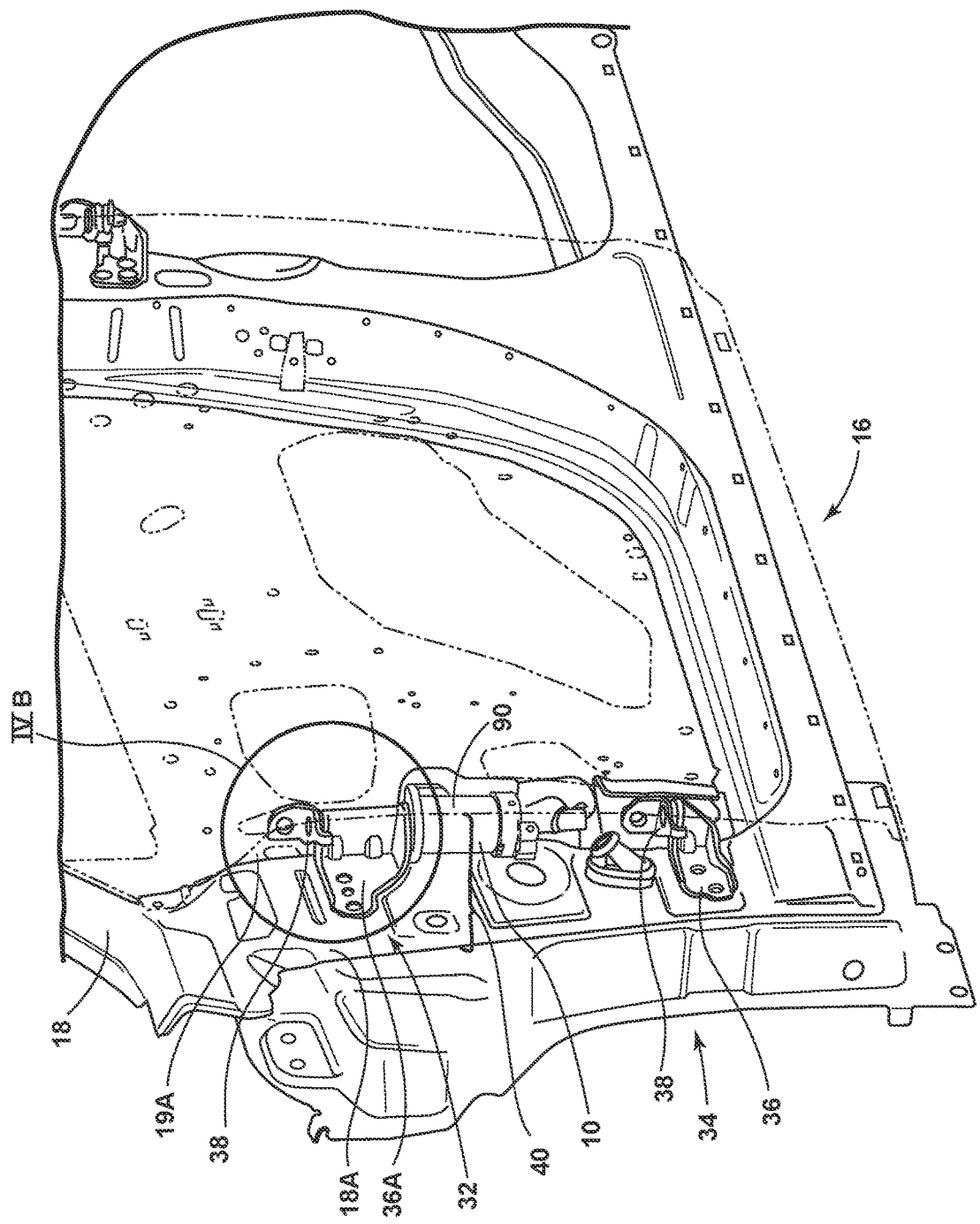
FIG. 4A is a fragmentary perspective view of a vehicle door shown with an inner panel in phantom in a closed position and a power assist device disposed between the door and the hinge-pillar.

Referring now to FIG. 4A, the power assist device 10 is shown disposed in the package compartment 40 between the door 16 and the hinge-pillar 18A. The power assist device 10 shown in FIG. 4A has a generally cylindrical body portion 90 which is contemplated to be approximately 70 mm in diameter and 115 mm in vertical length. Having such a configuration, the power assist device 10 can fit into the boundaries of the confined package compartment 40. In the embodiment shown in FIG. 4A, the upper hinge assembly 32 includes a modified fixed hinge portion 36A which is wider and more robust as compared to the fixed hinge portion 36 shown in FIG. 3. The modified fixed hinge portion 36A is shown in FIG. 4A as mounted on the hinge-pillar 18A. The moveable hinge portion 38 is shown disposed on an upper mounting portion 54 (FIG. 4B) of the fixed hinge portion 36A, and the power assist device 10 is disposed on a lower mounting portion 56 (FIG. 4B) of the fixed hinge portion 36A. The modified fixed hinge portion 36A provides a robust connection between the upper hinge assembly 32 and the hinge-pillar 18A for carrying the load of the door 16, as well as carrying the load of any torque imparted by the power assist device 10 when used to assist in opening and closing the door 16. It is contemplated that the door 16, as most conventional vehicle doors, can weigh approximately 90 lbs. or more as an assembled unit. Further information regarding the torque requirements necessary for moving the door 16 as powered from the hinge location by a power assist device are discussed below.

Figure 4B:
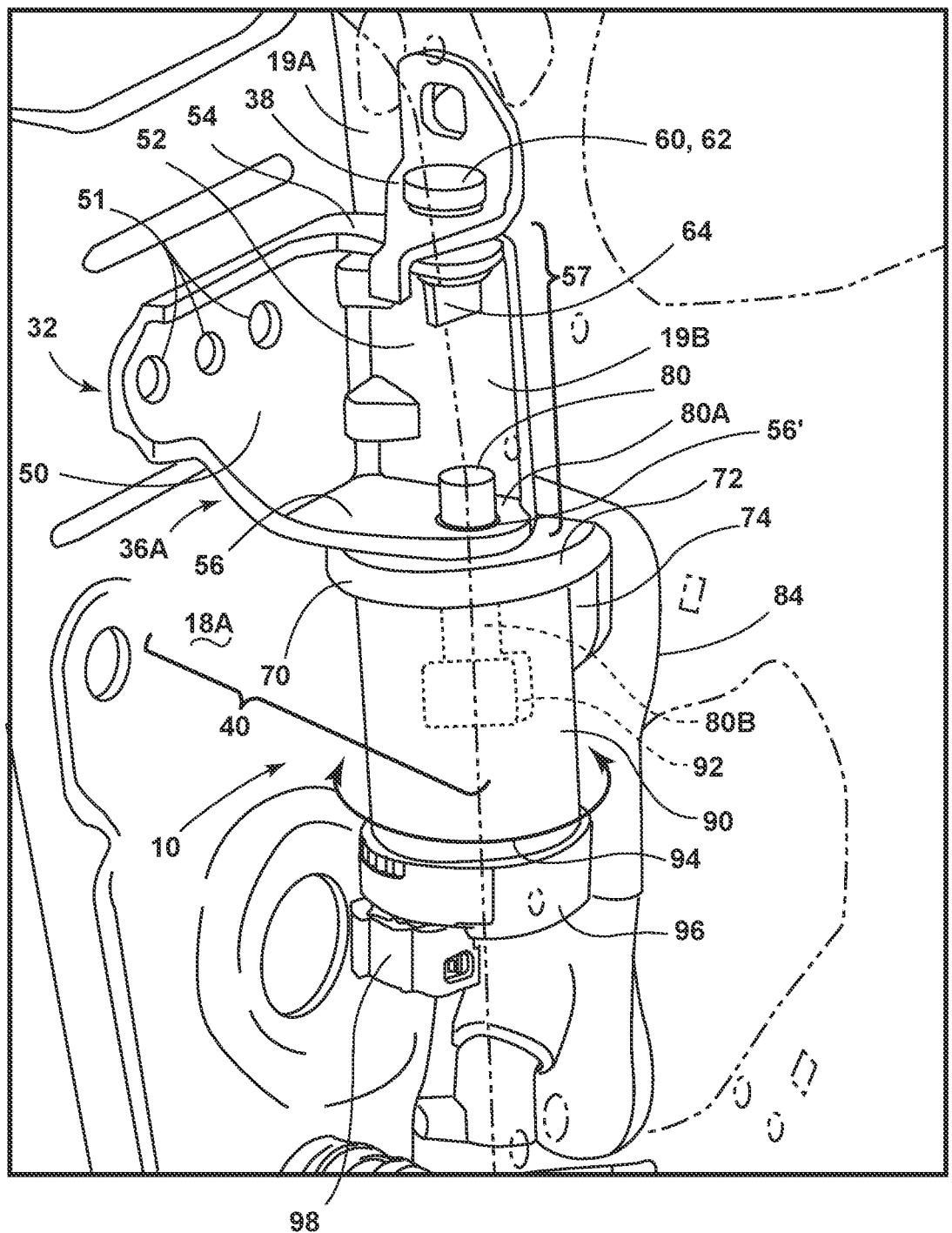
FIG. 4B is a perspective view of the vehicle door of FIG. 4A taken at location IVB.

Referring now to FIG. 4B, the fixed hinge portion 36A of the upper hinge assembly 32 is shown having a first portion 50 having mounting apertures 51 disposed therethrough for mounting the first portion 50 to the hinge-pillar 18A. The fixed hinge portion 36A further includes a second portion 52 extending outwardly from the first portion 50 in a substantially perpendicular direction. The second portion 52 includes upper mounting portion 54 and lower mounting portion 56. The upper mounting portion 54 is spaced-apart from the lower mounting portion 56 to define a clevis 57 therebetween. The spacing between the upper mounting portion 54 and the lower mounting portion 56 provides adequate clearance for tooling necessary to couple and adjust the position of the power assist device 10 to the lower mounting portion 56, and for coupling the moveable hinge portion 38 to the upper mounting portion 54 via hinge pin 60. The hinge pin 60 includes a head portion 62 and a body portion 64 which pivotally couples the fixed hinge portion 36A to the moveable hinge portion 38 at upper mounting portion 54. As noted above, moveable hinge portion 38 is coupled to sidewall 19A of the inner panel 19 in assembly, such that the moveable hinge portion 38 is coupled to and moves with the door 16. Similarly, the power assist device 10 is coupled to an L-shaped bracket having a first portion 72 and a second portion 74 disposed in an L-shaped configuration. The first portion 72 is disposed adjacent to the lower mounting portion 56 of the fixed hinged portion 36A for coupling the power assist device 10 thereto via a driveshaft 80. Specifically, the driveshaft 80 couples the power assist device 10 to the upper hinge assembly 32 at lower mounting portion 56 through aperture 56' of fixed hinge portion 36A. The driveshaft 80 is fixedly coupled to the fixed hinge portion 36A at an upper portion 80A of the driveshaft 80 by any means known in the art, such as a machined press fitting, or a bolt-on connection. The upper portion 80A of the driveshaft 80 may also include an angled cross-section configuration that is complimentary to an angled configuration of mounting aperture 56' of the fixed hinge portion 36A to better couple the driveshaft 80 to the fixed hinge portion 36A. Being fixedly coupled thereto, the driveshaft 80 serves as a pivot axis for the power assist device 10. The power assist device 10 is mounted to the door 16 at inner panel 19 via the second portion 74 of the L-shaped bracket 70 which is coupled to sidewall 19A of inner panel 19, such that the L-shaped bracket 70 rotates with the door 16 between opened and closed positions while the driveshaft 80 remains fixedly coupled to the fixed hinge portion 36A of the upper hinge assembly 32. In this way, the power assist device 10 is essentially coupled to the door 16 at inner panel 19 and operably coupled to the upper hinge assembly 32 to power or control the opening and closing of the door 16, as further described below.

With further reference to FIG. 4B, the power assist device 10 is shown having a motor 92 coupled to a lower portion 80B of the driveshaft 80. The motor 92 and the lower portion 80B of the driveshaft 80 are operably coupled to one another in a driven engagement and housed within the cylindrical body portion 90 of the power assist device 10. The motor 92 is contemplated to be an electric motor, power winch, actuator, servo motor, electric solenoid, pneumatic cylinder, hydraulic cylinder, or other like mechanism having sufficient power necessary to provide the torque required to move the door 16 between open and closed positions, as well as various detent locations, as powered from the hinge point of the door 16. Thus, the motor 92 is configured to act on the driveshaft 80 in a pivoting or rotating manner. With the upper portion 80A of the driveshaft 80 fixedly coupled to the upper hinge assembly 32, the cylindrical body portion 90 of the power assist device 10 will rotate in a manner as indicated by arrow 94 about the pivot axis defined by the driveshaft 80. With the power assist device 10 coupled to the inner panel 19 via L-shaped bracket 70, the rotating motion of the cylindrical body portion 90 of the power assist device 10 correlates to a pivoting motion of the door 16 between open and closed positions. As further shown in FIG. 4B, the power assist device 10 includes a lower cap 96 having an electrical connector 98 disposed thereon powering the device 10 and for receiving signal information from the controller 11 (FIG. 1) for translating user commands into power assisted door functionality.

Figure 4C:
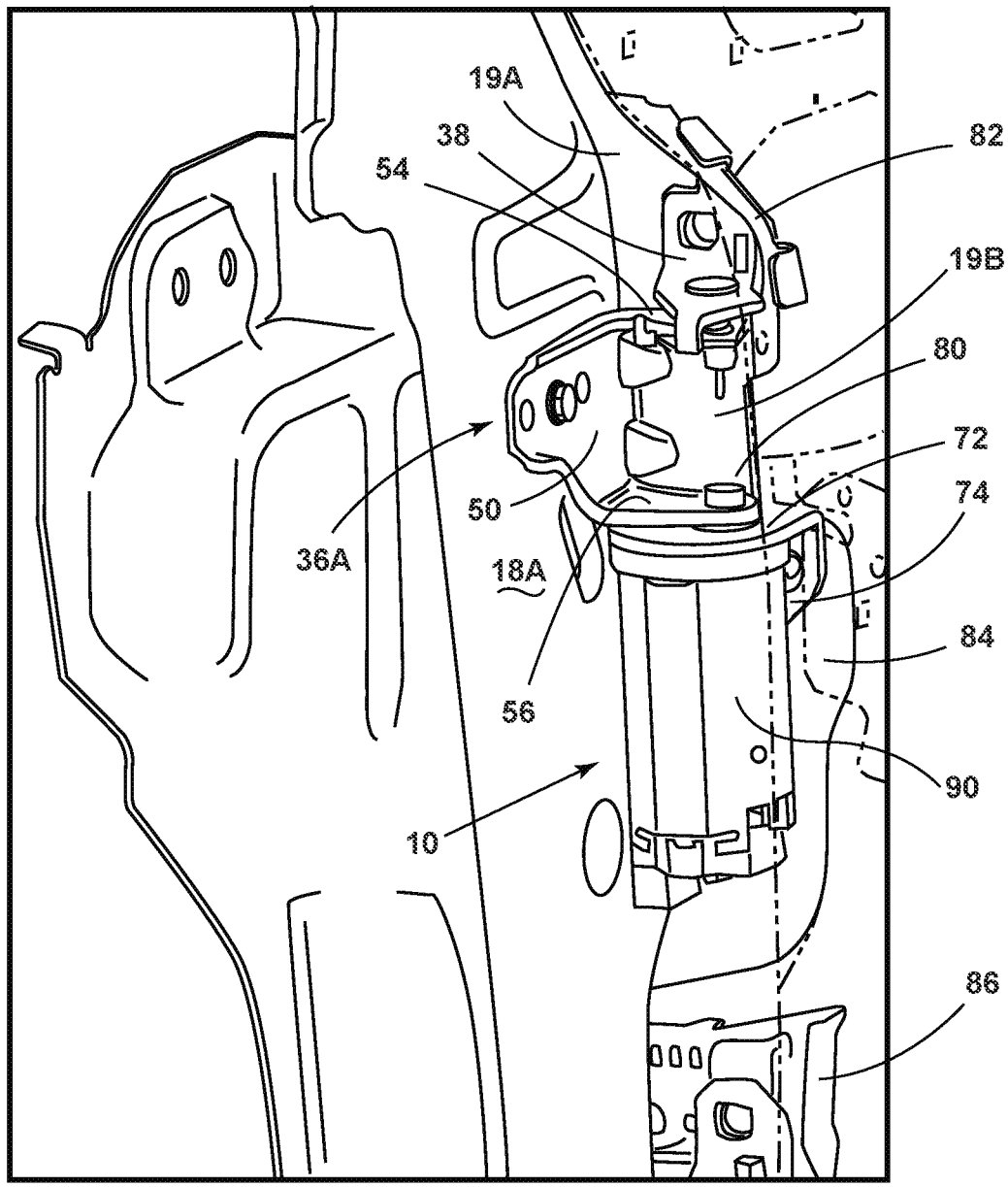
FIG. 4C is a perspective view of the vehicle door of FIG. 4A.
Figure 4D:
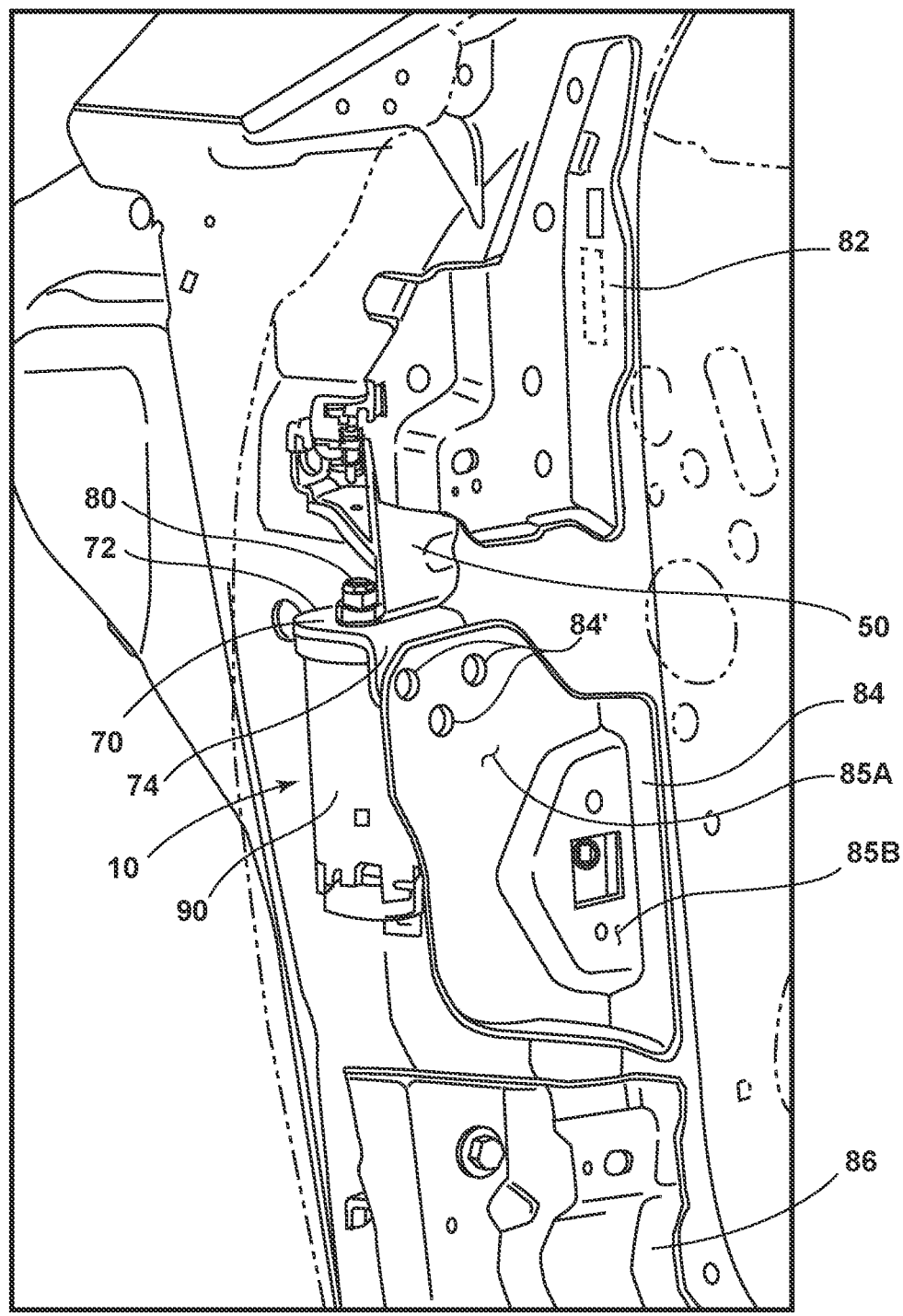
FIG. 4D is a rear perspective view of the vehicle door of FIG. 4A.

Referring now to FIGS. 4C and 4D, a middle door-side bracket 84 is coupled to an opposite side of the sidewall 19A of inner panel 19 relative to the second portion 74 of the L-shaped bracket 70. In this way, the sidewall 19A of the inner panel 19 is sandwiched between the L-shaped bracket 70 at second portion 74 and the middle door-side bracket 84. The middle door-side bracket 84 includes apertures 84' for coupling to complimentary apertures disposed on the second portion 74 of the L-shaped bracket 70 using fasteners, such as bolts. The middle door-side bracket 84 is a modified door-side bracket that provides a reinforced connection between the inner door panel 19 and the power assist device 10, to help stabilize the system from forces imparted on or imparted by the power assist device 10 when moving the door 16 between open and closed positions. With specific reference to FIG. 4D, the middle door-side bracket 84 includes an extended upper portion 85A which includes apertures 84' for coupling to the L-shaped bracket 70 through sidewall 19A. The middle door-side bracket 84 further includes a lower portion 85B which provides reinforcement for a door check device (not shown). As further shown in FIG. 4D, an upper door-side bracket 82 and a lower door-side bracket 86 are also disposed on an opposite side of sidewall 19A relative to the power assist device 10. Together, the door-side brackets 82, 84 and 86 act as doubler plates, providing reinforcement for the upper hinge assembly 32, the power assist device 10, and the lower hinge assembly 34, respectively. In this way, the door 16 of the present concept is heavily reinforced at the connection of the inner panel 19 with the hinge-pillar 18A through the upper and lower hinge assemblies 32, 34 and L-shaped bracket 70 of the power assist device 10 by the door-side brackets 82, 84, 86. The door 16 can also be further reinforced against torque from the power assist device 10 by coupling one or more reinforcement belts 21, 23 (FIG. 3) to the middle door-side bracket 84 and the inner panel 19 across the length of the door 16.

Figure 5A:
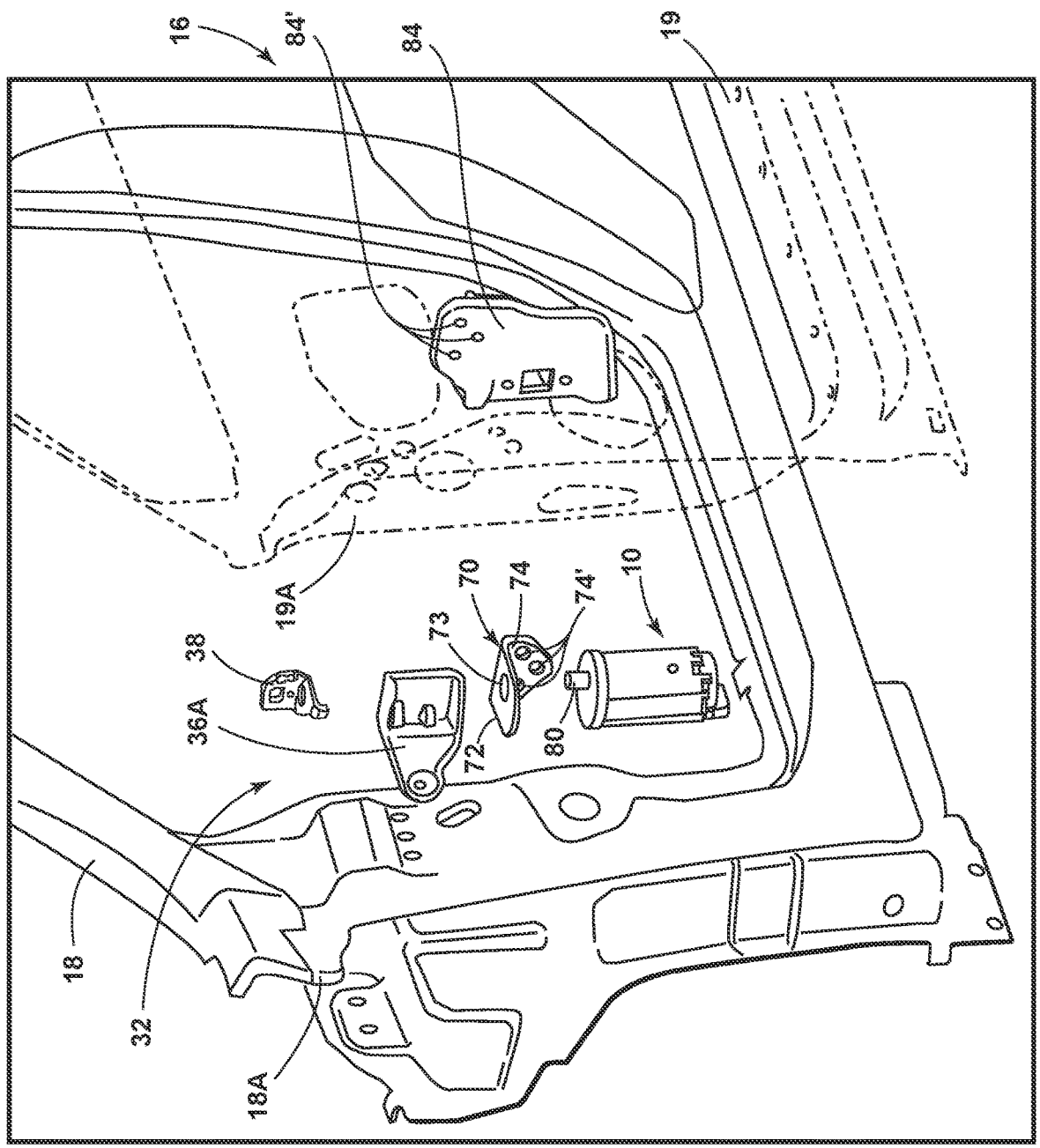
FIG. 5A is a fragmentary exploded view of a vehicle door and a power assist device.

Referring now to FIG. 5A, the door 16 is shown in an exploded view with the outer panel 17 (FIG. 1) removed and the inner panel 19 exploded away in phantom. Middle door-side bracket 84 is shown exploded away from the inner panel 19 and the upper hinge assembly 32 is shown with the fixed hinge portion 36A exploded away from the hinge-pillar 18A, and the moveable hinge portion 38 exploded away from sidewall 19A of the inner panel 19. The door mounted L-shaped bracket 70 is shown exploded away from the sidewall 19A of the inner panel 19 and also exploded away from the power assist device 10. As shown in FIG. 5A, the first portion 72 of the L-shaped bracket 70 includes an aperture 73 for receiving the upper portion 80A of the driveshaft 80 therethrough. As further shown in FIG. 5A, the second portion 74 of the L-shaped bracket 70 is configured to couple to sidewall 19A of inner panel 19 at mounting apertures 74', which coincide with mounting apertures 84' of middle door-side bracket 84 to provide a robust coupling between the door 16 and the power assist device 10.

Figure 5B:
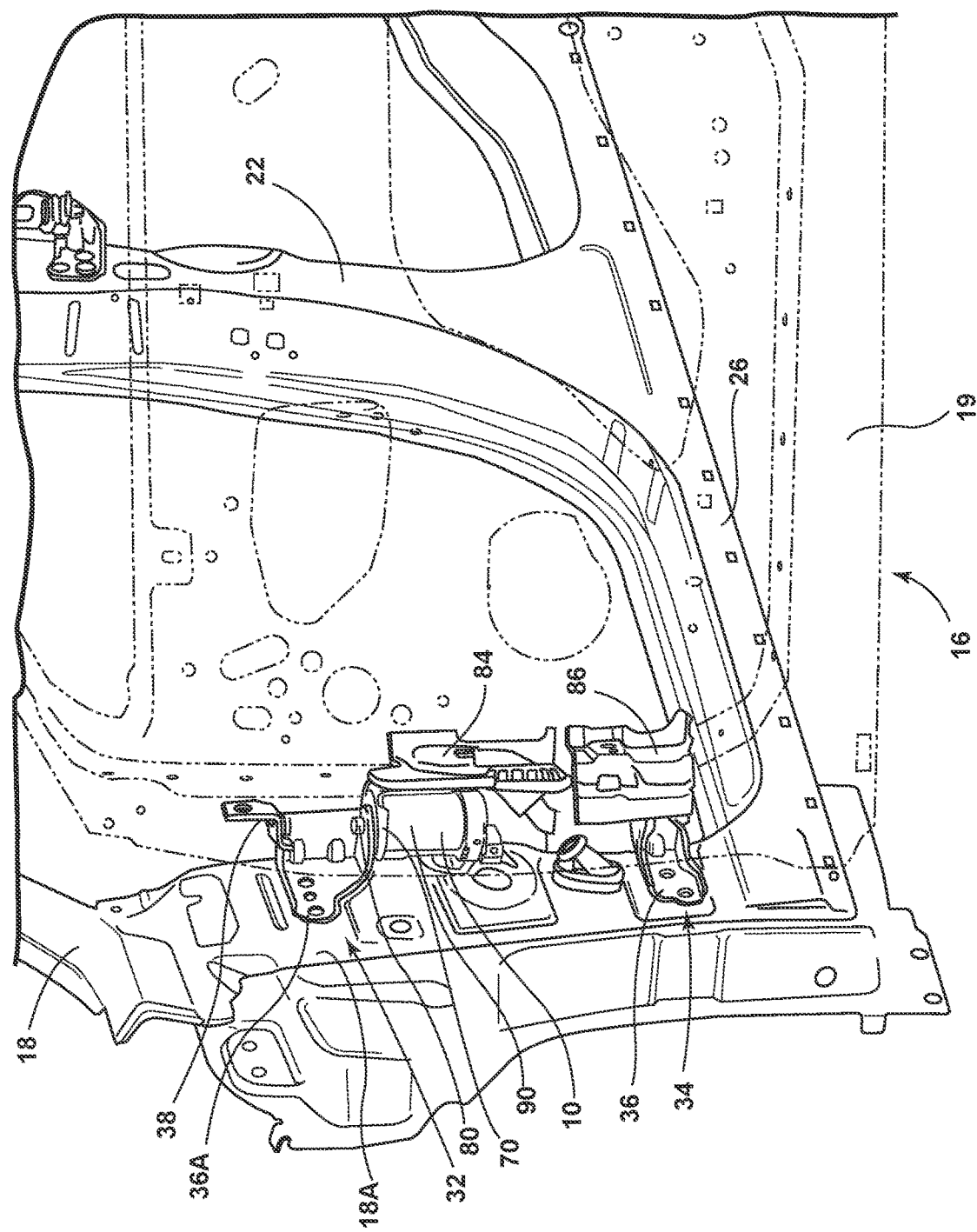
FIG. 5B is a fragmentary assembled view of the vehicle door and power assist device of FIG. 5A, with the door shown in an open position in phantom.

Referring now to FIG. 5B, the door 16 is shown in the open position with the outer panel 17 (FIG. 1) removed and the inner panel 19 shown in phantom. The exploded components for FIG. 5A are shown installed in FIG. 5B, and it is contemplated that the power assist device 10 can be installed in the vehicle during final trim and assembly, wherein the modified upper hinge assembly 32 provides spacing for an installer to radially adjust the power assist device 10 relative to the door 16 for proper axis alignment. Together, the lower mounting portion 56 of clevis 57 (best shown in FIG. 4B), the L-shaped bracket 70, and the middle door-side bracket 84 are used to provide radial adjustment of the power assist device 10 to insure axis alignment between the upper and lower hinge assemblies 30, 32 and the pivot axis of driveshaft 80 of the power assist device 10. As further shown in FIG. 5B, upper door-side bracket 82 has been removed to reveal mounting locations for the upper door-side bracket 82 relative to the moveable hinge portion 38 of the upper hinge assembly 32.

Figure 6:
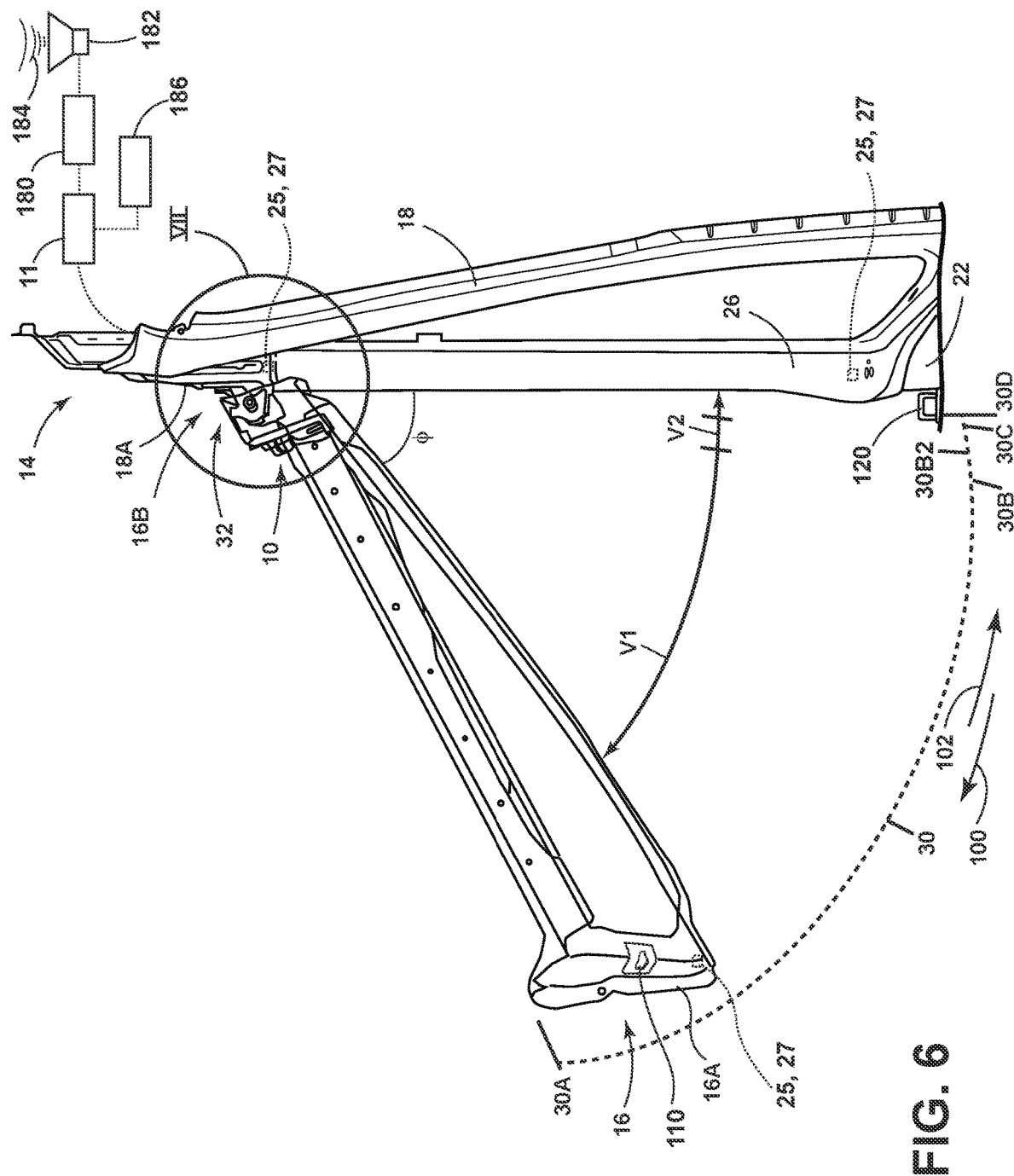
FIG. 6 is a top plan view of a vehicle door showing relative movement of the door between open and closed positions along a door swing path.

One aspect of the present concept is to provide a soft close experience to a user when closing a vehicle door via the power assist device 10. With reference now to FIG. 6, the door 16 is shown in an open position relative to the vehicle body 14. The door swing path 30 is shown having various door positions identified thereon. Specifically, reference point 30A indicates a fully open door position, which is approximately 1000 mm away from a flush and closed position along the curved door swing path 30. The flush and closed position is identified in FIG. 6 as reference point 30C. During a door closing operation, reference point 30B indicates an approximate door position where a soft close feature is initiated by the power assist device 10 to prevent a user from slamming the door 16 to the closed position 30C. Reference point 30D indicates an over-closed door position that is generally required in order to get a latch mechanism 110, disposed the door 16, to latch the door 16 in the closed position 30C. In normal operation, once latched by movement to the over-closed position 30D, the door 16 may slightly revert towards reference point 30C which indicates a door position that is essentially closed and flush with the vehicle body 14. In a normal door closing procedure, the door 16 is in a closing motion from reference point 30A, and the first time the door 16 reaches the position of reference point 30C, the door 16 will be flush with the vehicle body 14 but unlatched. In a normal door closing procedure, the door 16 must move from reference point 30C to the over-closed position at reference point 30D so that the door 16 will latch to the vehicle body 14. Then, the door 16 may slightly rebound towards the latched and flush position at reference point 30C. The present concept contemplates a sequence of door positions and latch configurations that can avoid the need to move the door 16 to the over-closed position 30D, while still getting the door 16 to latch to the vehicle body 14.

The door swing path 30 shown in FIG. 6 represents a swing path taken from the point of the door edge 16A. The hinge axis or hinge point for the door 16 is represented by reference numeral 16B. It is the hinge axis 16B from which the power assist device 10 controls the movement of the door 16, as described above. With reference to Table 1 below, the angle of the vehicle door 16 is shown along with the distance of the door edge 16A to the closed position 30C in millimeters. The torque required by the power assist device 10 is shown in Table 1 in order to close the vehicle door 16 from the various open door positions identified on swing path 30 in FIG. 6. The torque required to close the door 16 is shown in Table 1 as "with" and "without" inertia.

For the purposes of this disclosure the term "with inertia" implies that the door 16 is shut from a distance sufficient to generate inertia in the door movement, such that less torque is required from the power assist device 10. Further, inertia can be generated by an initial closing motion manually imparted on the door 16 by a user. Inertia is equal to the mass of the door 16 (about 60-90 lbs or 30-40 kg) times the rotational velocity (V1 in FIG. 6). When a user attempts to slam the door 16 along the rotational path 30, the power assist device 10 is configured to slow the door movement or rotational velocity V1 to velocity V2 to provide a slow closing motion. With regards to a user slamming the door 16, a 10 N·m acceleration applied continuously to a door for 60° rotation of the door is a very dramatic door slam with a terminal velocity of approximately 15 rpm or 90°/sec. For purposes of this disclosure any velocity of 5 rpm (30°/sec)-15 rpm (90°/sec) is considered slamming the door 16. In a normal closing motion, a user will generally give a door a minimum of 0.33 rpm or 2°/sec at least at the last 5° of the closing motion to sufficiently close the door. The power assist device of the present concept is configured to provide the slow close feature when the initial velocity V1 exceeds a predetermined velocity threshold. The velocity threshold may be in a range of about 5 rpm (30°/sec) or greater.

TABLE 1

| Door Position | Door edge Distance to latch (mm) | Angle from vehicle body | Torque to close with inertia (N · m) | Torque to close without inertia (N · m) |
|---|---|---|---|---|
| 30A | 1000 mm | 60+ deg | <10N · m | 40N · m |
| 30B | 175 mm | 20 deg | 40N · m | 40N · m |
| 30B-2 | 70 mm | 8 deg | 40N · m | 100N · m |
| 30C | 25 mm | 1.6 deg | 80N · m | 300N · m |
| 30D | 15 mm | 1 deg | 200N · m | 610N · m |

Consistent with Table 1 above, movement of the door 16 from position 30A to position 30B is approximately 825 mm and identifies a portion of the swing path 30 between position 30A and 30B that could be a slamming motion initiated by a user. As a user manually initiates a door slamming motion, the door 16 will move along the door swing path 30 at an initial velocity V1 (approximately 5-15 rpm) until the door 16 reaches position 30B. At approximately position 30B, the door 16 will slow to a slow close velocity V2 (approximately 0.33 rpm) by a resistance force imparted by the power assist device 10 on the upper hinge assembly 32 to slow the door movement between positions 30B and 30C from the initial velocity V1 to the slow close velocity V2. The slow close velocity V2 may be in a range of about 0.1 rpm to about 0.5 rpm, and more preferably about 0.33 rpm. It is contemplated that the torque required by the power assist device 10 to slow the door 16 to a slow and gentle close of 0.33 rpm along the door swing path 30 is approximately 200 N·m. The amount of time required for slowing the movement of the door 16 from velocity V1 to velocity V2 between door positions 30B to 30C is approximately 200-300 milliseconds. It is contemplated that the power assist device 10 will operate in this manner to absorb the energy from the slamming door motion along swing path 30 while the vehicle is in a key-off operation. Driving operation is not required for the slow close functionality. In this way, the power assist device 10 provides a gentle close or slow close for the door 16, even when a user attempts to slam the door 16 shut.

With further reference to FIG. 6, a door opening direction is indicated by reference numeral 100. The door 16 of the present concept is contemplated to be in communication with a variety of sensors which are configured to detect an object positioned in the door swing path 30, such that the power assist device 10 of the present concept can slow or stop the door 16 to prevent the door 16 from opening into an object positioned along the door's swing path 30, when such an object is detected. The torque required to slow or stop the door 16 during the opening movement (path 100) is contemplated to be approximately 200 N·m and is further contemplated to take approximately 200-300 milliseconds during a user initiated door opening sequence. Further, the power assist device 10 of the present concept provides the door 16 with an infinite number of detents (door checks) along the swing path 30. The position of the detents or door checks may be customized by the user and programmed into the controller 11 (FIG. 1) which is in communication with the power assist device 10, for controlling movement of the same. The door checks are contemplated for use with an automatic door opening sequence powered by the power assist device 10 in the direction as indicated by arrow 100. The torque required to stop the door 16 during an automatic door opening sequence powered by the power assist device 10 at a predetermined door check position is approximately 10-50 N·m. In this way, the power assist device 10 can be preprogrammed by a user to open the door 16 to a desired door check position along the door swing path 30 and hold the door 16 at the selected door check position for the user to enter or exit the vehicle without worry of the door 16 opening any further, or possibly into an adjacent obstruction. In this way, the power assist device 10 of the present concept provides infinite door check along the swing path 30 of the door 16. Pre-set door check positions may be preprogrammed into the controller 11 (FIG. 1), and user selected/customized door checks may also be programmed into the controller 11.

With further reference to FIG. 6, another aspect of the present concept includes the ability to reduce door opening and closing efforts when the vehicle is parked on a hill or slope. The power assist device 10 is contemplated to be provided with signal information from the controller 11 to provide assistance in opening the door 16 in the direction as indicated by arrow 100 in a slow and consistent manner when a vehicle position is declined, such that the door opening motion would generally be increased due to an downward angle of the vehicle from the back to the front of the vehicle. As a corollary, the power assist device 10 can provide door closing assistance to aid in closing a door that is positioned at a downward angle, so that both the door opening and door closing efforts are consistent. Similarly, when the vehicle is parked on an inclined or up-hill slope, the power assist device 10 is configured to provide a reduced closing velocity of the door 16 in the closing direction as indicated by arrow 102 based on signal information received from the controller 11 to the power assist device 10. The power assist device 10 can also provide door opening assistance to aid in opening a door that is positioned at an upward angle, for consistency. It is contemplated that such power assistance in the direction as indicated by arrows 100, 102, would require up to 200 N·m of torque for a duration of approximately 10-20 seconds. In this way, the power assist device 10 of the present concept is able to provide consistent door opening and closing efforts, such that the user is provided a consistent door opening and closing experience regardless of the inclined, declined or substantially horizontal position of the vehicle.

Figure 7A:
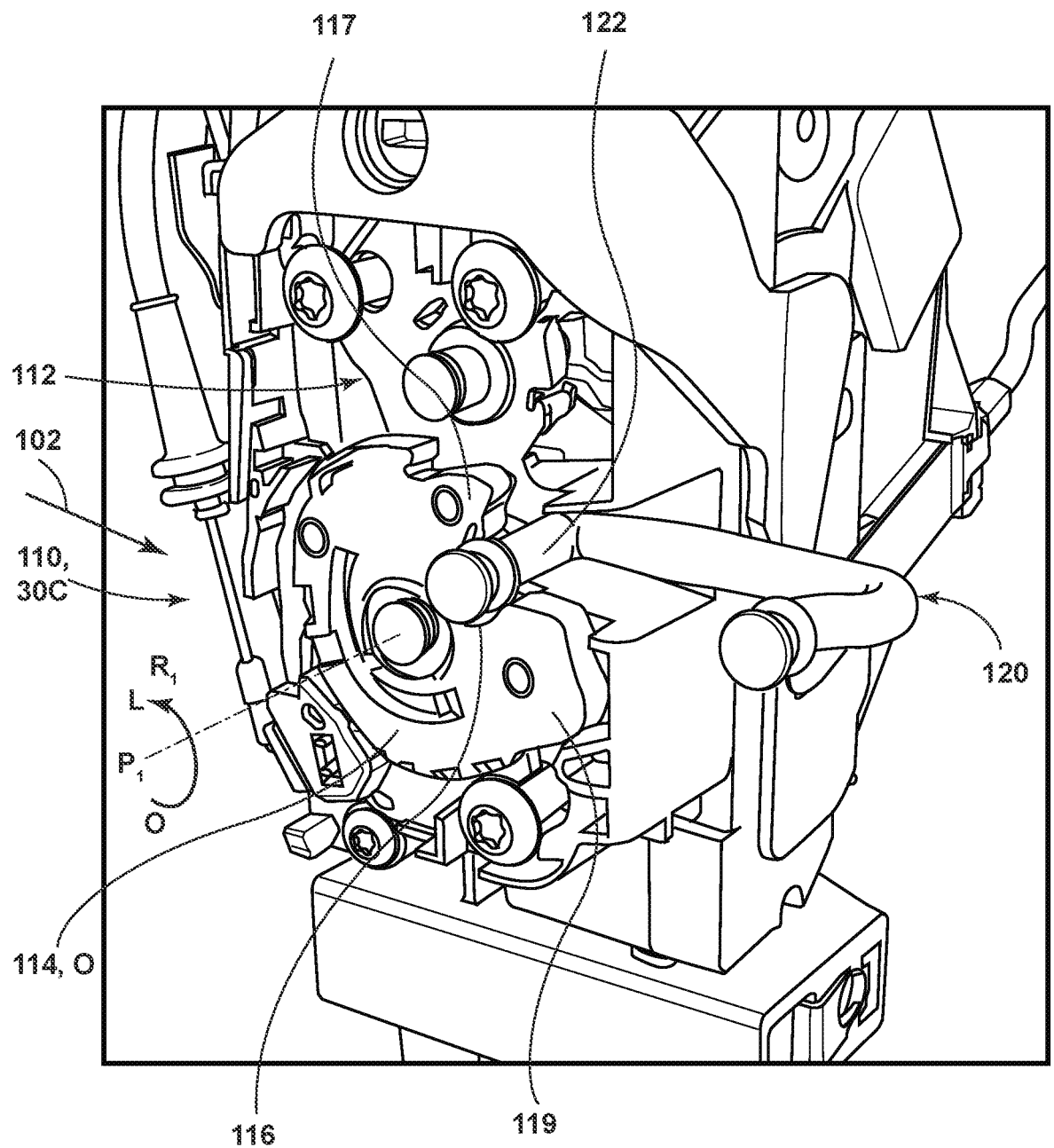
FIG. 7A is a perspective view of a latch mechanism having a catch in an open position and latch striker.
Figure 7B:
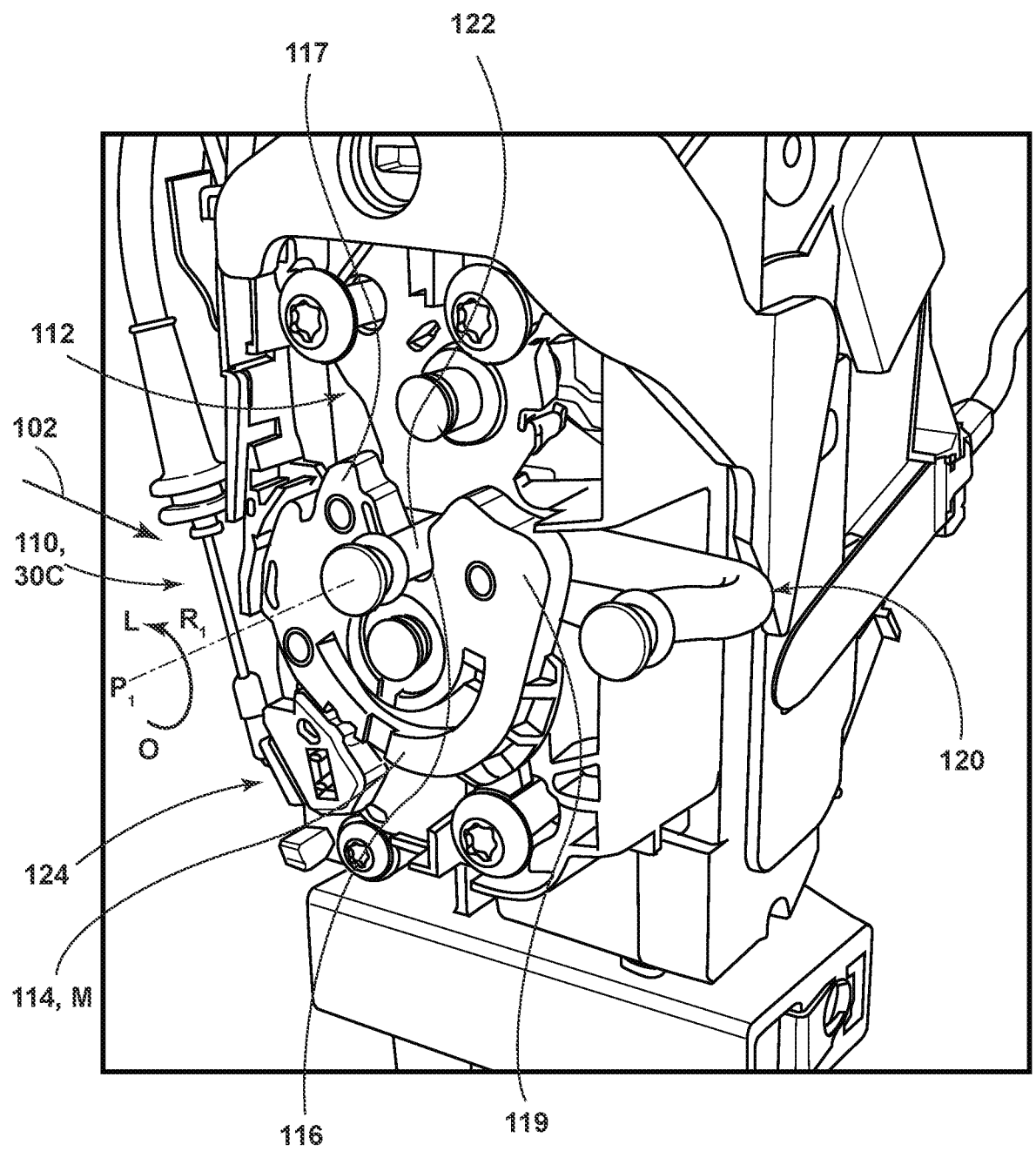
FIG. 7B is a perspective view of the latch mechanism of FIG. 7A with the catch in a midpoint position.
Figure 7C:
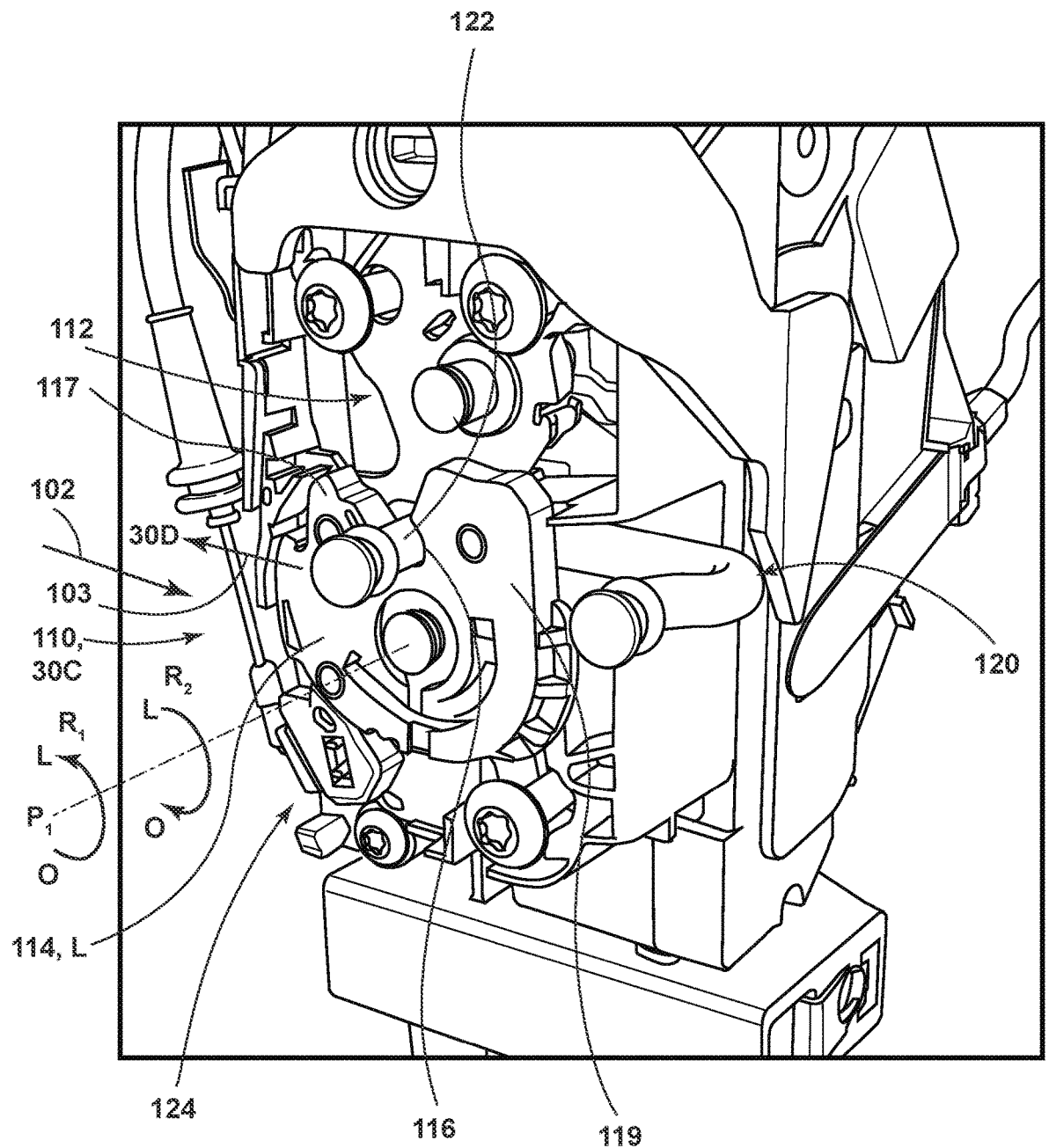
FIG. 7C is a perspective view of the latch mechanism of FIG. 7B with the catch engaged with the latch striker in a latched position.

Referring now to FIG. 7A, the latch mechanism 110 is shown and is of the type that is generally disposed on either a pillar of a vehicle, such as the B-pillar 22 of vehicle 12 shown in FIG. 6, or on the vehicle door 16. As illustrated in FIGS. 7A-7C, the latch mechanism is contemplated to be mounted on the door 16 for movement therewith along swing path 30. As described above, the latch mechanism 110 is configured to maintain the door 16 in a closed and latched condition (at position 30C in FIG. 6), and is further configured to release the door 16, such that the door 16 can move to any one of the open positions from the latched position. As shown in FIG. 7A, the latch mechanism 110 generally includes a latch housing 112 having a catch 114 rotatably mounted thereto along a pivot axis P1. The catch 114 includes a slot 116 and is configured to rotate in a counterclockwise direction as indicated by arrow $R_1$ from the open position O to the latched position L. In the embodiment shown in FIG. 7A, the latch mechanism 110 is shown with an outer cover removed, such that the rotating motion of the catch 114 can be illustrated. In FIG. 7A, the catch 114 is shown in the open position O and prepared to receive a latch striker 120 which is commonly positioned on a pillar of a vehicle, such as B-pillar 22 shown in FIG. 6. The latch mechanism 110 may also be positioned on the B-pillar 22 of the vehicle body 14, with the latch striker 120 positioned on the door 16 at door edge 16A. In either configuration, the latching of the door 16 to the vehicle body 14 will work with the present concept. For purposes of this disclosure, it is contemplated that the latch striker 120 is positioned/mounted on the B-pillar 22 of the vehicle body 14 with the latch striker 120 mounted on the door 16 at the door edge 16A for latching alignment between the two components. In FIG. 7A, the door 16 and B-pillar 22 have been removed, such that the interaction of the latch striker 120 and the catch 114 of the latch mechanism 110 can be illustrated. As further shown in FIG. 7A, the latch mechanism 110 moves with the door 16 towards the stationary latch striker 120 in a closing direction as indicated by arrow 102 as the door 16 moves along the swing path 30 shown in FIG. 6. With the catch 114 in the open position O, a front portion 122 of the latch striker 120 will generally contact a contact portion 117 of the catch 114. In this way, the movement of the door 16 against the latch striker 120 will move the catch 114 from the open position O towards the latched position L along the path $R_1$. This movement rotates a latch portion 119 of the catch 114 upward towards a tipping point or midpoint M (FIG. 7B) of rotation along the rotational axis P1 of the catch 114 in the direction as indicated by arrow $R_1$. The rotation of the catch 114 and the movement of the door 16 positions the front portion 122 of the latch striker 120 into the slot 116 of the catch 114. In FIG. 7A, the latch mechanism 110 is shown in the open position O and approaching the latch striker 120 as the door nears door position 30C (FIG. 6).

Referring now to FIG. 7B the catch 114 is shown at the tipping point or midpoint M between the open position O (FIG. 7A) and the latched position L (FIG. 7C). At the midpoint M, it is contemplated that the door 16 is in the closed position 30C (FIG. 6) and the latch portion 119 of the catch 114 has rotated in a counterclockwise direction as indicated by arrow $R_1$ towards the latched position L as the front portion 122 of the latch striker 120 acts on the contact portion 117 of the catch 114. In this midpoint position M, the front portion 122 of the latch striker 120 is substantially nested within the slot 116 of the catch 114. As noted above, in a normal door latching operation the door 16 must move to the over-closed position 30D in order for the door 16 to latch to the latch mechanism 110 via the latch striker 120. In standard operation, movement of the door 16 to the over-closed position 30D releases the catch 114 from a locking mechanism 124, such that the latch mechanism 110 will fully rotate to the latched position L as biased thereto. However, the latch mechanism 110 of the present concept provides a catch release feature that releases the catch 114 from the locking mechanism 124 when the catch 114 is at the midpoint position M and the latch striker is at least partially received in the slot 116 of the catch 114. With the catch 114 released and biased towards the latched position L, the catch 114 will fully rotate to latch onto the latch striker 120. It is contemplated that the catch release feature of the present concept can be a feature that is part of an automatic door closing sequence powered by the power assist device 10 from the hinge axis 16B (FIG. 6).

Referring now to FIG. 7C the catch 114 is shown in the fully latched position L. At this point, the latch portion 119 of the catch 114 has rotated in a counterclockwise direction as indicated by arrow $R_1$ to the fully latched position L, and the front portion 122 of the latch striker 120 is fully retained within the slot 116 of the catch 114. The position of the latch mechanism 110 is commensurate with a position of the door 16 in a latched condition at position 30C. In order to release the door 16 from the latched position L, the latch striker 120 must be released from the catch 114. The release of the door 16 is brought about by the catch 114 being released from a locking mechanism, which then allows the catch 114 to rotate in a clockwise direction indicated by arrow $R_2$ to release the latch striker 120 from the catch 114. Once released, the door 16 can move to any one of the open positions along swing path 30 (FIG. 6). For a power assisted door movement, the latch mechanism 110 will release the door striker 120 upon command from the controller 11 so that the door 16 can open as powered by the power assist device 10.

In an effort to reduce the amount of torque required for the power assist device 10 to close and latch the door 16, the latch mechanism 110 is configured to release the catch 114 from locking mechanism 124 when the movement of the door 16 has rotated the catch 114 to the midpoint M. This happens somewhere between the door position 30C and 30D. Generally, a user would have to move the door 16 to the over-closed position 30D in order to release the catch 114 from locking mechanism 124. Movement of the door 16 to the over-closed position 30D is illustrated in FIG. 7C along path 103 relative to the latch striker 120. Such a movement would require too much torque from the power assist device 10, and would likely result in a bending of the door 16 as the power assist device 10 is powered from the hinge axis 16B of the door 16. In releasing the catch 114 at the midpoint M, it is contemplated that the latch mechanism 110 is electronically coupled to the controller 11 (FIG. 1) that can sense the door position, so that the catch 114 is released when the door 16 has been moved to a position that rotates the catch 114 to the midpoint M. The controller 11 provides for proper power assistance in opening and closing the door 16 and further coordinates with the latch mechanism 110 for latching the door 16 to the vehicle body 14 using a variety of sensory information, as further described below.

Referring again to FIG. 6, one or more position sensors 25 are disposed around the door 16. The mounting locations of the position sensors 25 shown in FIG. 6 are exemplary only. The power assist system of the present concept can use one or multiple position sensors 25 to calculate the position of the door 16. The position sensors 25 can relay positional data to the controller 11 in millimeters from a closed position, or in degrees relative to the vehicle body 14. The position sensors 25 may correspond to a variety of rotational or position sensing devices. In some embodiments, the position sensors 25 may correspond to an angular position sensor configured to communicate the angular position $\phi$ of the door to the controller 11 (FIG. 1). The angular position $\phi$ may be utilized by the controller 11 to control the motion of the door 16 via the power assist device 10. The position sensors 25 may be in the form of an absolute and/or relative position sensor. Such sensors may include, but are not limited to encoders, quadrature encoders, potentiometers, accelerometers, Hall effect sensors, internal motor position sensing, etc. The position sensors 25 may also correspond to optical and/or magnetic rotational sensors. Other sensing devices may also be utilized for the position sensors 25 without departing from the spirit of the disclosure.

Each position sensor 25 may be utilized in addition to various switches and sensors to communicate to the controller 11 that the door 16 is secure and oriented in the closed position. The position sensor 25 may communicate that the door 16 is located in a position corresponding to the latched position L thereof, or otherwise oriented proximate the vehicle body 14. In one example, a traditional closure switch or a door proximity sensor can also be included as a backup or redundancy to such utilization of the position sensors 25. The position sensors 25 may also be utilized to provide feedback to the controller 11 to assist in positioning the door 16 to detect obstructions. In particular, controller 11, when directing power assist device 10 to move door 16 to either the open position or the closed position (or a particular angular position $\phi$ therebetween), can use position sensor 25 to determine if door 16 is actually moving, such as by comparing the indicated angular position $\phi$ at successive intervals. If door 16 remains in a particular angular position $\phi$ for a predetermined period of time (in an example for about 0.5 seconds or in another example for up to about 1 second or two seconds), while controller 11 is attempting to close door 16, controller 11 can infer that door 16 is obstructed and take a desired corrective measure. In further examples, position sensor 25 can be used to identify a status or orientation of the door 16 prior to initiating operation of the vehicle 12. In another example, controller 11 can output the determined condition of door 16, such as to a vehicle control module, such that the vehicle control module can utilize the condition information for door 16 in, for example, presenting a door ajar warning to a user of vehicle 12. For example, such a warning can be presented in the form of an audible signal through a standalone speaker or through a vehicle sound system. The warning can also be presented graphically or by an indicator light or an audible signal (or a combination thereof) on a human-machine interface ("HMI") or user interface within a vehicle cabin.

Figure 8:
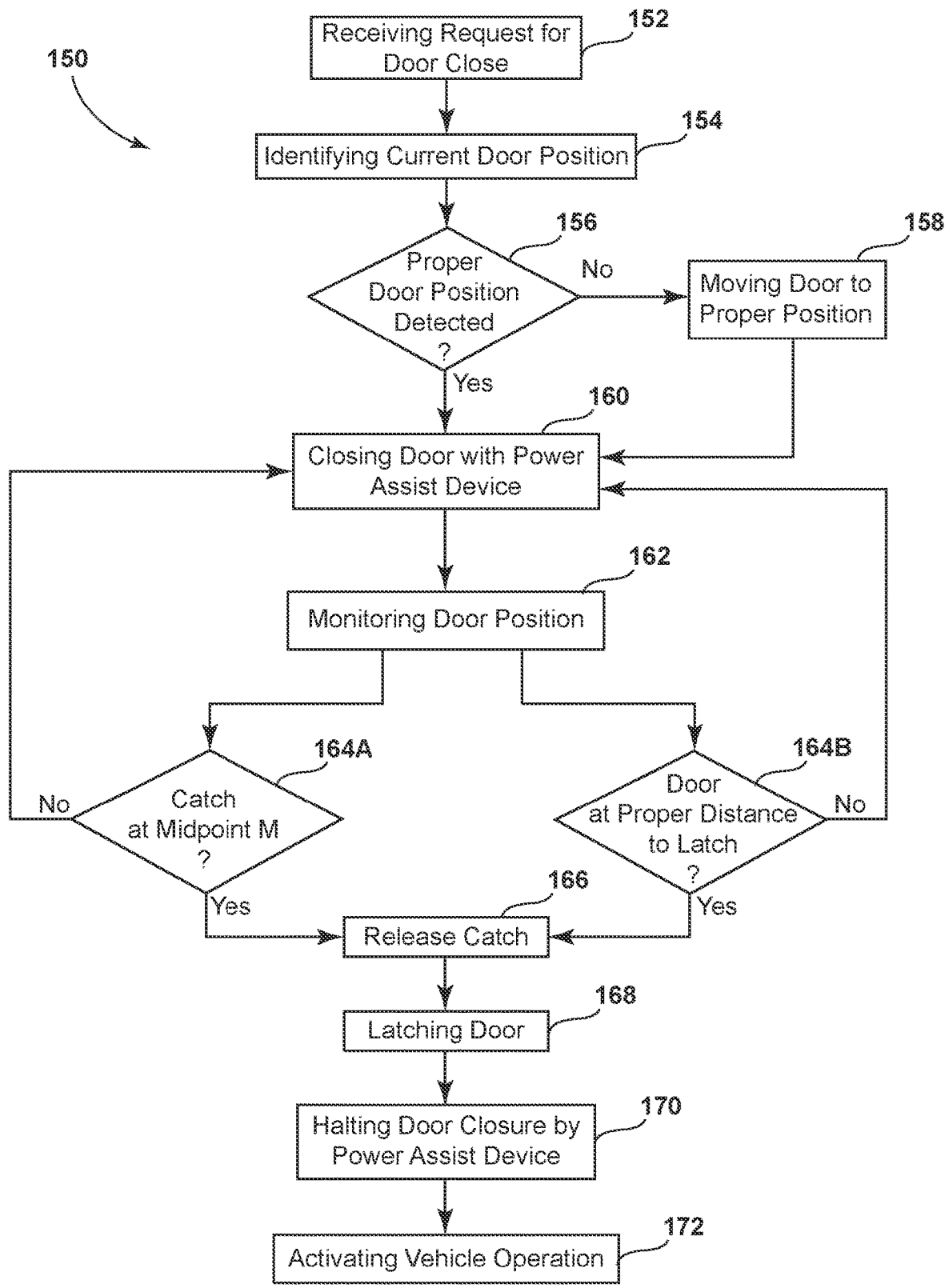
FIG. 8 is a flow chart of a method for controlling a door assist system.

As noted above, the latch mechanism 110 and power assist device 10 are in communication with the controller 11. Thus, in a door closing sequence, the latch mechanism 110 and power assist device 10 are configured to work in concert through the controller 11 to reduce the amount of torque required by the power assist device 10 to close and latch the door 16. Referring now to FIG. 8, and with further reference to FIGS. 6 and 7A-7C, a flow chart of a method for controlling a door assist system 150 is shown. Specifically, FIG. 8 illustrates a door closing and latching sequence. The method 150 may begin in response to the controller 11 receiving an input signal (step 152) from a door control device requesting that an open door 16 be positioned in the closed and latched position 30C (FIG. 6). It is noted that the signal from the door control device may be a signal requesting that a door be fully opened or moved to a predetermined detent position as well. The door control device may include a push-button feature on the vehicle 12 or door 16, a remote button on a key fob, a remote smartphone device, an audio or voice command, a gesture made by the user, or other like command signaling device. In response to receiving the input signal from the door control device, the controller 11 may activate one or more position sensors 25 to identify the position of the door 16 in step 154. Using the signal data from the one or more position sensors 25, the controller 11 identifies if the door 16 is in a proper position for closing the door 16 (step 156). A proper position can be determined by the torque required to close the door 16 from the position detected by the position sensors 25. For instance, with reference to Table 1 and FIG. 6, if the door 16 is in any one of the positions 30A, 30B or 30B2 when a door closing command is received, than the door 16 is far enough away from the vehicle body to generate inertia to close and latch the door 16. However, if the door 16 is in position 30C, or in a position between position 30C and 30B2 that would require a torque exceeding a predetermined threshold torque, such as more than 200 N·m of torque, than the power assist device 10 may not be able to provide the necessary torque to close the door 16 from the hinge point 16B without bending the door 16. It is contemplated that the power assist device 10 functions properly and consistently with a standard door weighing 60-90 lbs at 250 N·m of torque, and more preferably at 200 N·m of torque or less. Therefore, if the door position is detected at a vehicle proximity or door angle that exceeds a predetermined torque threshold detected by the controller, the controller 11 will control the power assist device 10 to open the door 16 from the initial position (requiring an exceeding torque level) to a second position, which is the nearest position to accommodate a closing of the door 16 with a lower torque requirement (step 158). Thus, moving from the initial position to the second position involves moving the door 16 to an open position, or partially open position, where the door 16 can be closed using inertia. For example, if the door 16 is detected at position 30C (which requires 300 N·m of torque to close the door), the controller 11 can engage the power assist device 10 to move the door 16 along path 100 (FIG. 6) to an open position requiring less torque, such as position 30B2 (70 mm from vehicle at 8°) requiring 100 N·m to close the door 16 without inertia, as shown in Table 1. Thus, the second position will have a greater associated door angle than an associated door angle calculated from the initial position, as the second position puts the door edge at a greater distance from the vehicle body as compared to the initial position. It is further contemplated that sensors can detect obstructions before opening the door 16 to a better closing position.

When a proper position of the door 16 is detected (step 156), the power assist device 10 begins to close the door 16 (step 160) while the controller 11 monitors the angular position φ of the door 16 or distance of the door 16 to the vehicle body 14 by processing position information from the one or more position sensors 25 (162). As the door 16 nears the closed and flush position 30C, the latch mechanism 110 can signal to the controller 11 that the catch 114 is at the tipping point or midpoint M (step 164A) as urged by the latch striker 120 (FIG. 7B). In an alternative step (step 164B), the controller 11, using the input data from the position sensors 25, can sense that the door 16 is at a door position where the latch mechanism 110 will latch the door 16 to the vehicle body 14 if the catch 114 is released from the locking mechanism 124. Using either step 164A or 164B, the controller can determine if the door is properly positioned to release the catch 114, and if so, release the catch 114 (step 166) and latch the door 16 to the vehicle body 14 at the latch striker 120 (step 168). When step 168 is complete, the door 16 will be in the closed and latched position (30C) as represented in FIG. 1 and FIG. 7C.

In step 170, if the door closing sequence is determined to be complete, the controller 11 may halt the power assist device 10. Additionally, the controller 11 may output a control signal that may identify that the door 16 of the vehicle 12 is secure, such that a vehicle operation may be activated (172). A vehicle operation may include releasing a parking brake, engaging an autonomous vehicle operation, initiating a security system if the vehicle is unoccupied, locking the door or otherwise enabling an operation of the vehicle 12 that may be completed when the door 16 is located in the closed and latched position.

One such vehicle operation includes an audible door latch confirmation system, wherein an audible alert signal is sounded in response to the door 16 being fully latched to the vehicle body 14. The power assist device 10 of the present concept is contemplated to close the door 16 in a slow and controlled manner as discussed above. As the latch mechanism 110 of the door 16 engages the latch striker 120 disposed on the vehicle body 14, the catch 114 engages the latch striker 120 in a substantially quiet manner that may not be detectable by the user. In a normal door closing operation, a user will hear a latch mechanism and latch striker engage one another as a door is swiftly closed and latched in one fluid movement initiated by the user. With the power assist device 10 of the present concept providing a soft closing feature for the door 16, the standard latching sound is not present in a door closing procedure, such that a user may be unaware if the door 16 is properly latched. Referring again to FIG. 6, the controller 11 is shown coupled to a human-machine interface (HMI) or user interface 180 which is further coupled to a sound source 182. The sound source 182 may be a speaker system having one or more speakers that are configured to provide an interior acoustic signal, and exterior acoustic signal, or both. Further, the sound source 182 may be directly coupled to the controller 11, and, as shown in FIG. 6, may also represent a preinstalled sound system of the vehicle 12. The sound source 182 may include exterior/external speakers (sounding outside of the vehicle cabin), interior/internal speakers (sounding within a vehicle cabin), or a combination of both. Further, the sound source 182 may include a speaker disposed on a portable electronic device, such as a mobile phone, a key fob, or other like device that is capable of remotely receiving a remote signal from the controller 11 to sound or play the audible acoustic signal.

Figure 9:
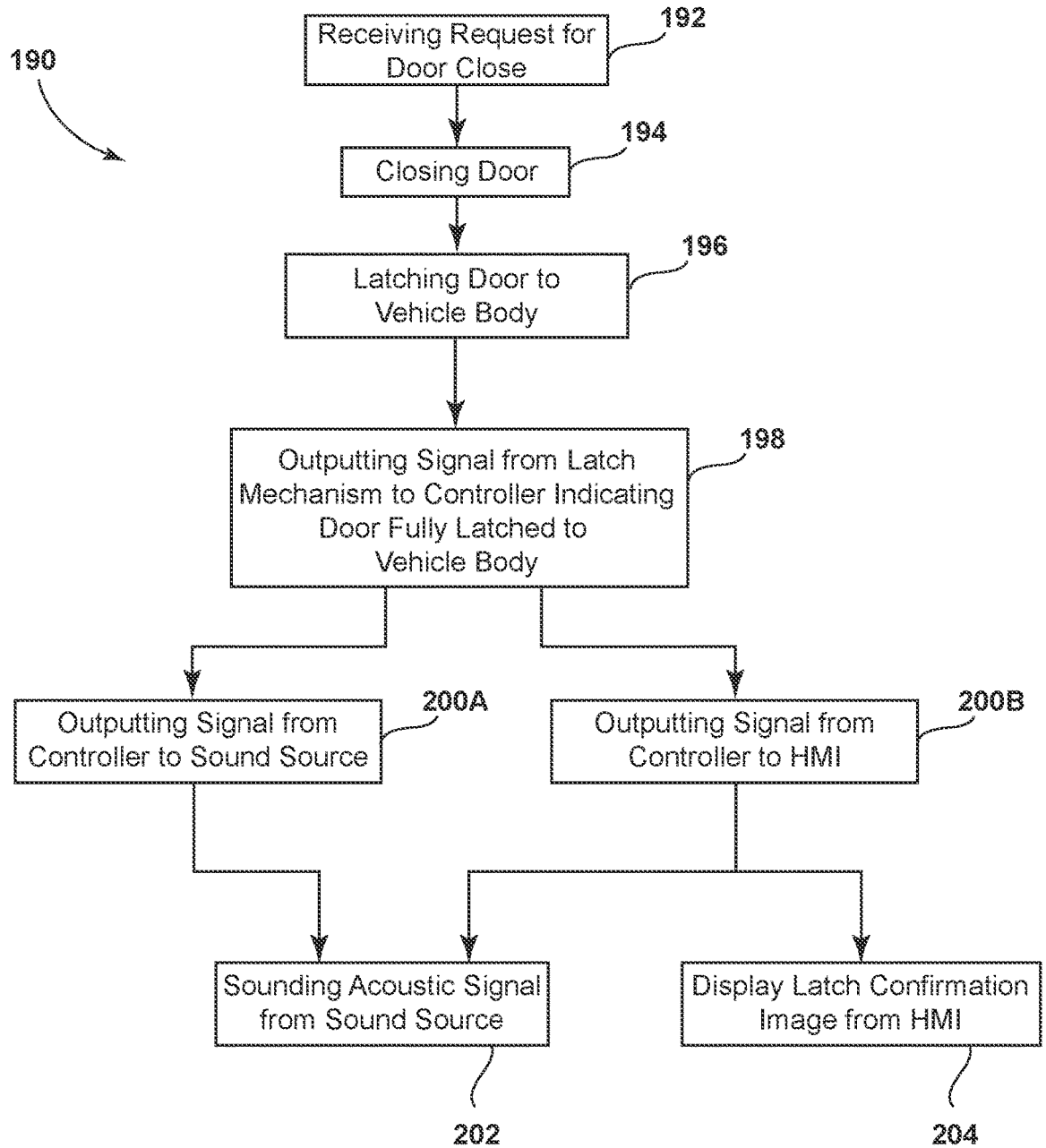
FIG. 9 is a flow chart of a method for confirming a latched condition of a door.

Referring now to FIG. 9, an audible door latch confirmation system 190 is represented in the form of a flow chart for alerting a user of a latched condition of a door. In step 192, a door closing operation is initiated by a user from a door control device in a similar manner as described above with reference to FIG. 8. In step 194, the door 16 latches to the vehicle body 14, in a similar manner described above with reference to the latch mechanism 110 and the latch striker 120 (See FIGS. 7A-7C). When the catch 114 of the latch mechanism 110 is in the latched position L (step 196), a latch signal from the latch mechanism 110 is sent to the controller 11 to indicate that the door 16 is properly latched to the vehicle body 14 (step 198). As noted herein, the latch signal relaying the latched condition of the door 16 can come from a powered latch mechanism or sensor detecting the latched condition. For example, the position of the catch 114 can complete a circuit with the latch housing 112 to send the signal when the catch is in the latched position L. Further, a position sensor can identify a latched condition when the latch striker 120 engages the catch 114, and the catch 114 is released and moves to the latched position L, as biased thereto. When the controller 11 receives the signal data indicating that the door 16 is latched to the vehicle body 14 in a latched condition, the controller 11 may either output a signal directly to the sound source 182 (step 200A) or direct the signal to the sound source 182 (FIG. 6) through the HMI 180 (step 200B) for sounding an acoustic signal 184 from the sound source (step 202) and/or a graphic image on a display screen of the HMI to provide door latch confirmation. The acoustic signal 184 may be any audible sound in the form of a voice tone confirming a latched condition, a beep or series of beeps, a simulation of a traditional latching sound, or a selected audio file uploaded by a user to the controller 11 for sounding using the sound source 182. It is contemplated that the controller 11 may have a multitude of preprogrammed acoustic signals stored therein for selection by the user using HMI 180. It is further contemplated that the acoustic signal 184 can be a different acoustic signal as assigned to each vehicle door disposed on the vehicle 12. The audible acoustic signal 184 may include a voice message, such as "front driver-side door closed", "front passenger door closed", "rear passenger door closed", or may include an assigned door number or a specific beeping sequence signal assigned to a specific vehicle door. When the acoustic signal 184 is a simulation of a traditional latching sound, the acoustic signal can be a digital recording of a door latching to a vehicle that is used to provide a replicated latching sound for the acoustic signal 184 from the sound source 182. Further, the acoustic signal 184 can be any sound played or sounded from the sound source 182 sufficient to alert a user of the latched condition of the door 16.

To prevent unauthorized access to the vehicle 12 (FIG. 1) through the power assist device 10, the controller 11 may first seek to identify if a user is an "authorized" user. This may be done by voice recognition, image recognition, specific gesture recognition, the presence of a key fob, or other like verifying method using sensors placed in communication with the controller 11. With regards to voice recognition, the controller 11 can be configured to only accept a voice command from an identified authorized user, as further described below.

Figure 10:
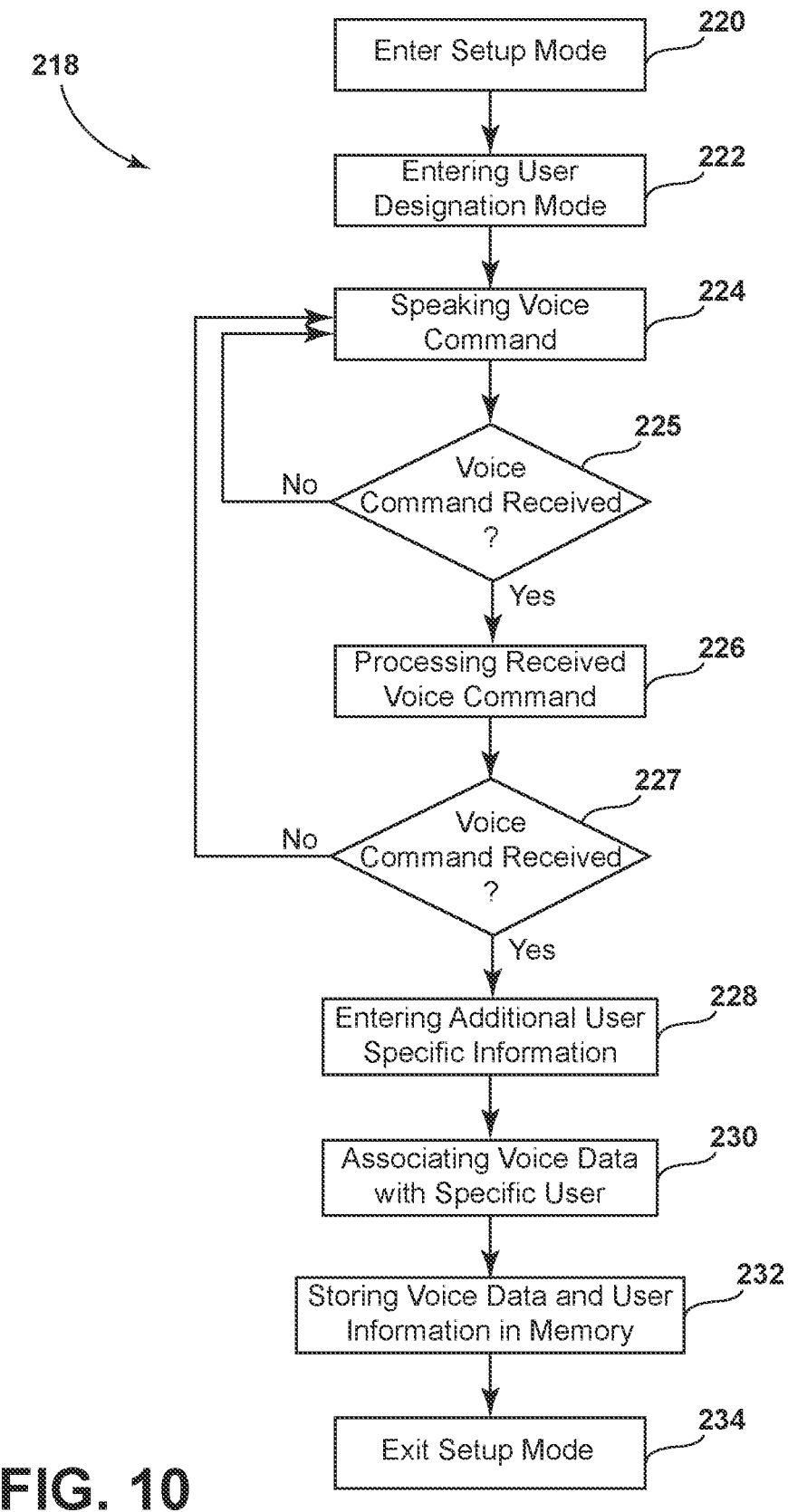
FIG. 10 is a flow chart of a method for identifying an authorized user.

In one embodiment illustrated in FIG. 10, a user authorization mode 218 shows how a user can be designated as an authorized user by entering the setup mode (step 220) through the HMI 180 (FIG. 6). The HMI 180 can be accessed directly within the vehicle or remotely using a smartphone application, or the like. In the setup mode, the user can have voice recognition data stored in a memory of the controller 11 that may be associated with an authorized user. In the embodiment shown in FIG. 10, the user can enter a user designation mode (step 222) before entering a voice command (step 224), which can activate the controller 11 to receive and process a signal from a voice recognition device 186 (FIG. 6) (step 226). When the controller 11, through the voice recognition device 186, recognizes a given voice in a catalog of voice recognition data stored within, the user can be prompted to enter information (step 228) that is then associated with the voice (step 230), such that the voice corresponds to a specific authorized user. The voice data, and any additional information entered by the user, is then stored in the memory of the controller (step 232) before the setup mode is optionally exited (steps 234). The user information can also be stored in the memory of the controller and associated with the voice data, such that, upon recognition of the specific authorized user, other vehicle systems (e.g. climate control, seating, multimedia, etc.) can be configured automatically according to known or learned preferences of the particular authorized user. The voice data can, alternatively, be obtained, by the user uploading an audio file using a smartphone application or by entering other voice data into the system using the HMI 180, for example.

With reference again to FIG. 6, it is noted that the position sensors 25 may also be audio sensors 27 positioned around the door 16. Further, the vehicle 12 may include both position sensors 25 and audio sensors 27. The audio sensors 27 are contemplated to be digital audio sensors capable of detecting the acoustic waves of voice commands to provide a digital signal externally in a format readable by the controller 11 and/or the voice recognition device 186, such as a PDM format. Particularly, the audio sensors 27 may be disposed in the interior of the vehicle or the exterior of the vehicle and are configured to detect and receive voice commands given by the user from inside or outside of the vehicle, or through a smartphone application or other remote transmitting device, and transmit the voice command data remotely via a signal to the controller 11. Voice command data received by the audio sensors 27 may include voice or other audio command sequences, and may further include a plurality of voice commands for interpretation. For example, the voice recognition device 186 may be operable to communicate voice command data recorded or detected by the audio sensors to the controller 11 for performance of a specific vehicle function controlled by the controller 11. The controller 11 is configured to identify the voice command and associate a particular authorized user with the given voice command. The controller 11 is further configured to compare the received voice command data to a particular sequence or order of voice commands previously saved and associated with a particular function of the vehicle 12. In this way, the controller 11 can establish a particular control command associated with the voice command date received by the signal. Upon interpreting the control command to determine that the voice command data received from the audio sensors 27 contains authorized commands that correspond to a particular door function, the controller 11 may activate the power assist device 10 to open the door 16, close the door 16 or detent the door 16 at a specific position. In this way, the power assist device 10 controls movement of the door 16 in accordance with a particular voice command identified by the controller 11 and/or the voice recognition device 186. The door movement command can be audibly played by a user interface or displayed on the user interface for confirmation of a transcript of the door movement command by the user before the door is moved. Similarly, when the audio sensor is remote relative to the vehicle, the confirmation of the door movement command can be processed through a smart phone, or other portable electronic device. It is contemplated that the voice recognition device 186 can be incorporated into the controller 11, or be a separate unit as shown in FIG. 6. Further, it is contemplated that the audio control system can use one or more audio sensors 27 to receive various voice commands, such as digital microphones capable of capturing the transmitting a voice command to the controller 11.

Figure 11:
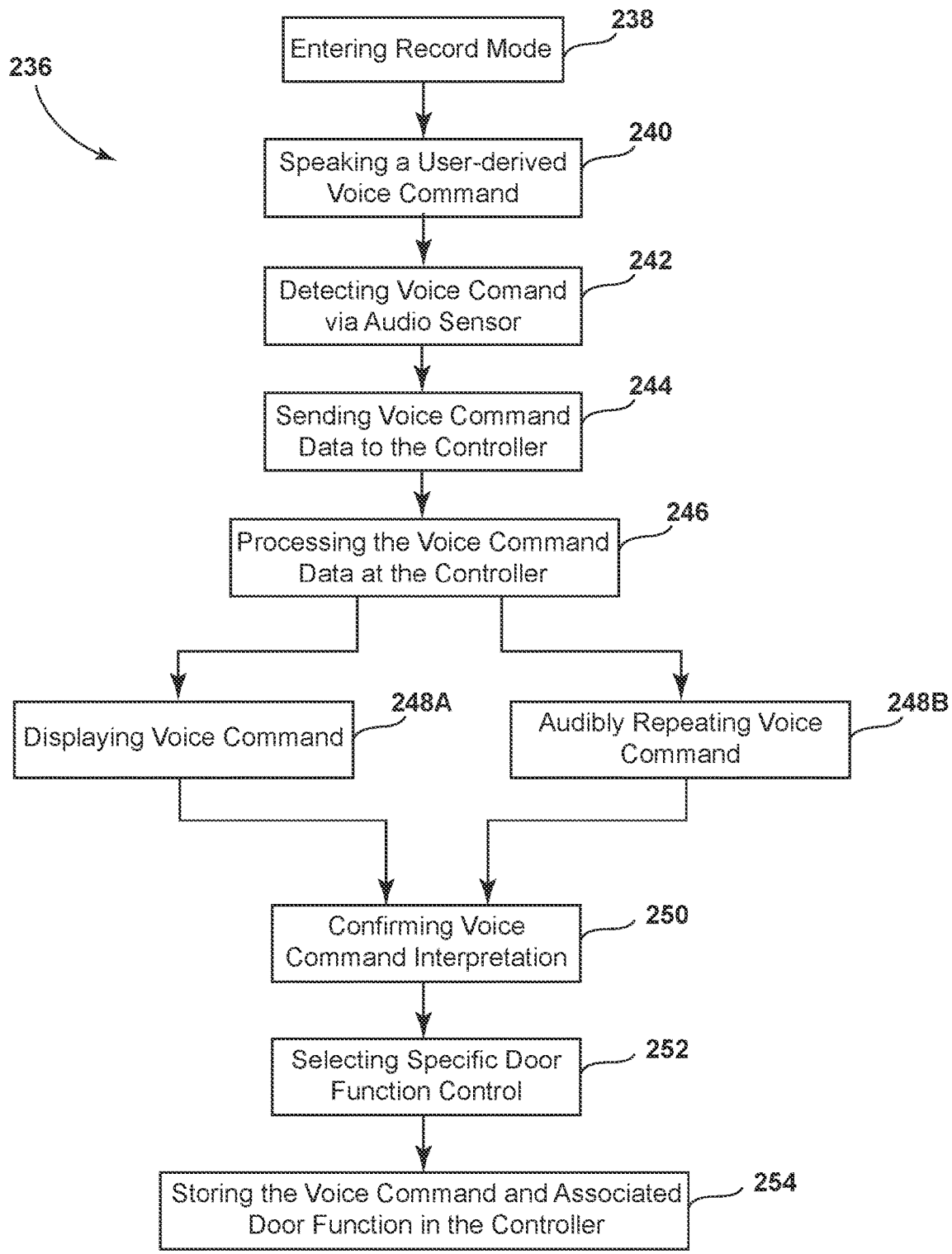
FIG. 11 is a flow chart of a method for controlling a door assist system using voice commands.

The controller 11 can be pre-programmed with a number of voice commands for opening, closing, or repositioning the door 16 using the power assist device 10. An authorized user can initiate the pre-programmed voice commands by speaking a voice command to the audio sensors 27. In another aspect, the voice recognition system may further include protocol for entering user-derived or customized voice commands, as shown in the customization protocol 236 of FIG. 11. In this aspect, a user may enter a "record" mode (step 238) in which a user-derived voice command is spoken by the user (step 240) within a field of audible detection by the audio sensors 27 (step 242). It is contemplated that the user can initiate the record mode with a push of a button on a key fob associated with vehicle 12 or by speaking a predetermined voice command. When the user-derived command is detected by the audio sensors (step 242), resulting voice command data is signaled to the controller 11 (step 244) for processing the voice command data (step 246). As an optional confirmation step, the controller 11 can cause the HMI 180 to display a transcription of the recorded voice command (step 248A), for which a desired control or function is unknown. Similarly, the controller 11 can audibly repeat the voice command, as interpreted by the controller 11, using the sound source 182 (FIG. 6) (step 248B). The user can then determine whether to use the recorded voice command by confirming the same (step 250), or the user can decline the controller's interpretation and reenter a new voice command. Once a voice command is confirmed by the user, the user selects a specific door function control to be associated with the confirmed voice command (step 252). Selection of the door function control may be conducted by selection from a list of functions displayed on the HMI. At this point, the previously unknown voice command is stored in the memory of the controller as a voice command in association with the desired door function (step 254) selected by the user.

Figure 12:
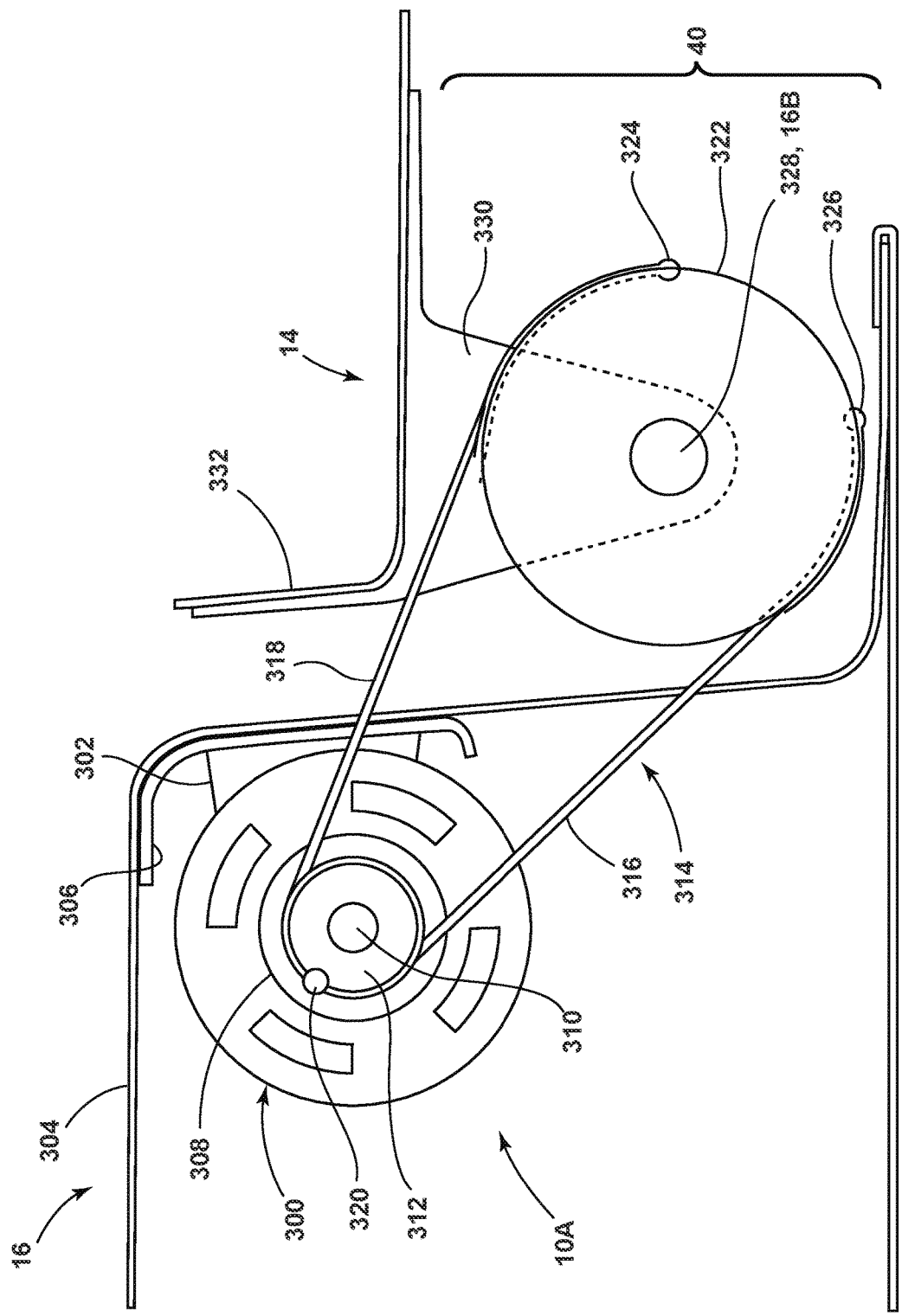
FIG. 12 is a top plan view of a power assist device coupled to a vehicle door and vehicle body, according to another embodiment.

Referring now to FIG. 12, another embodiment of a power assist device 10A is shown. Specifically, the power assist device 10A shown in FIG. 12 is a bi-directional winch. In FIG. 12, a motor 300 is shown mounted on a mounting bracket 302 which is further mounted to a panel 304 at a reinforcement plate 306. It is contemplated that the panel 304 is a door panel, such as inner panel 19 described above, such that the motor 300 is mounted to the door 16 for movement therewith. The motor 300 includes a stand-off portion 308 from which a drive shaft 310 outwardly extends and is configured for rotation as powered by the motor 300. A first spool 312 is mounted on the drive shaft 310 for rotational movement therewith, and is configured to engage a cable 314 having first and second ends 316, 318 extending outwardly from the first spool 312. The cable 314 is coupled to the first spool 312 at an eyelet 320. The cable 314 is shown wrapped around the first spool 312 a number of times and extends to a second spool 322, where the first and second ends 316, 318 of the cable 314 are coupled to the second spool 322 at first and second eyelets 324, 326. The cable 314 is operably coupled to the first and second spools 312, 322 and is configured to translate rotational movement of the first spool 312, powered by the motor 300, to the second spool 322 for driving movement of the door. The second spool 322 is mounted to a spool axle 328 which is further mounted to a mounting bracket 330 disposed on a panel 332. The panel 332 and bracket 330 are contemplated to be disposed on the vehicle body 14 within the package constraints of the package space 40. The bracket 330 is contemplated to be part of a hinge assembly, such as hinge assemblies 32, 34 described above, such that spool axle 328 defines the hinge axis 16B of the door 16 relative to the vehicle body 14. The spool axle 328 is coupled to a hinge assembly, such that rotation of the second spool 322 and spool axle 328 drives movement of the door between open and closed positions.

Figure 13:
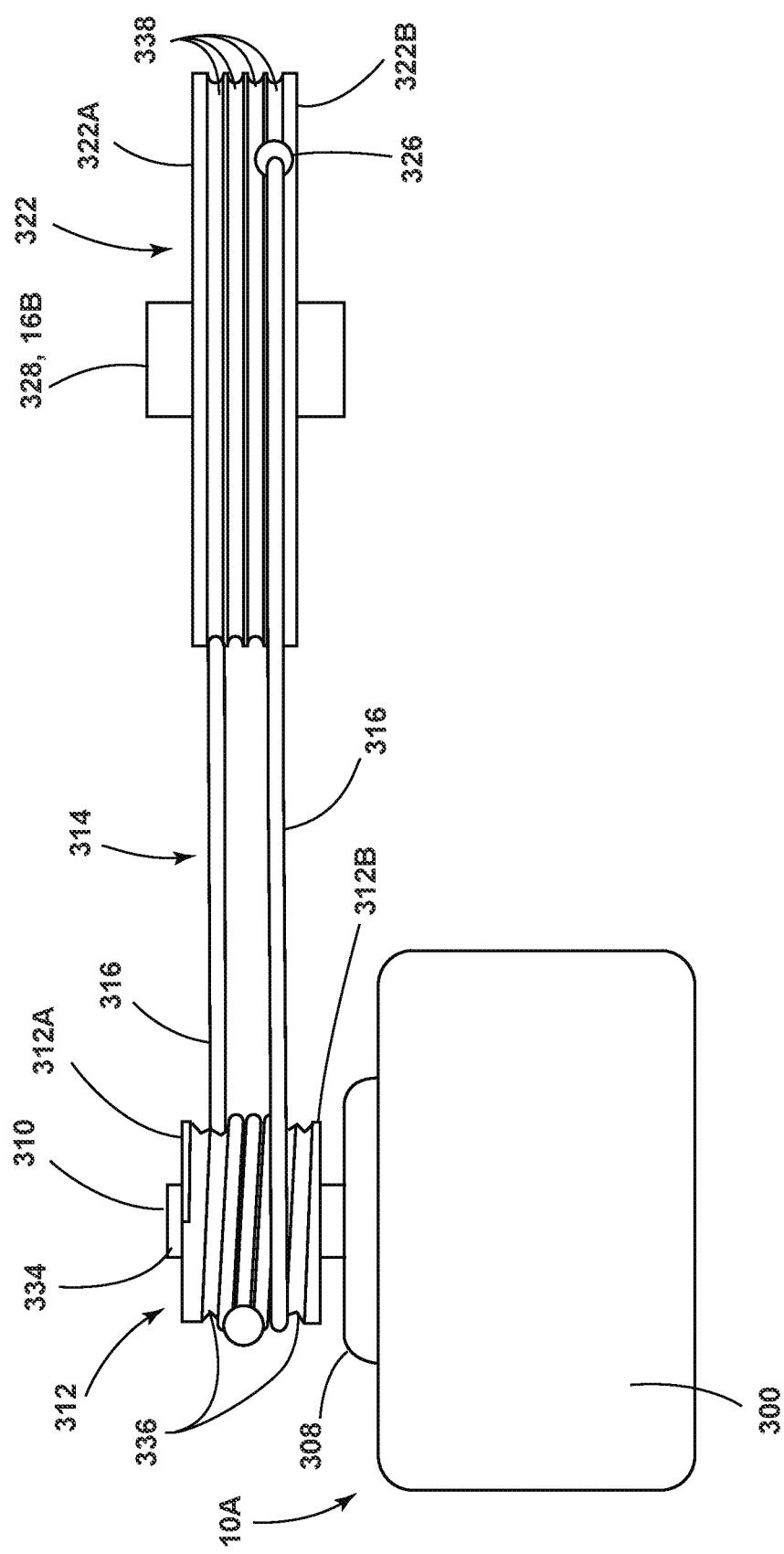
FIG. 13 is a side elevational view of the power assist device of FIG. 13.

Referring now to FIG. 13, the first spool 312 is shown mounted on the drive shaft 310 which is coupled to the motor 300. The first spool 312 includes a continuous spiral channel 336 which extends between first and second sides 312A, 312B of the drive shaft 312, wherein the spiral channel 336 defines a nesting channel for guiding the cable 314 as the cable 314 winds around the first spool 312 during rotational movement of the first spool 312. The spiral channel 336 provides for a clean and organized wind of the cable 314 when using the bi-directional winch 10A. Similarly, the second spool 322 includes a continuous spiral channel 338 extending between first and second ends 322A, 322B of the second spool 322. In this way, as the cable 314 winds on either the first spool 312 or the second spool 322 during power door movement, the cable 314 will neatly wind in the nested locations defined by the spiral channels 336, 338. As further shown in FIG. 13, the first spool 312 includes a bearing 334 disposed near the first side 312A of the first spool 312 to define a first bearing point. When using the bi-directional winch 10A as a mechanism for powering a power door, a large amount of torque is realized on the first spool 312, such that bearing 334 provides for reinforcement of the first spool 312 at the first side 312A thereof. The motor 300, disposed near the second side 312B, provides for a cantilevered second bearing point for further stabilizing the first spool 312 in use. Thus, the bi-directional winch 10A of the present concept allows for the first spool 312 to be substantially reduced in radius as compared to the second spool 322 due to the dual bearing points of the first spool. This bearing arrangement provides an increased amplification ratio when attempting to power an opening or closing operation for a vehicle door.

The increased amplification of the power assist device 10A is due to the radius of the first spool 312 being less than the radius of the second spool 322. The decreased radius of the second spool 312 is able to withstand the torque associated with powering door movement by the first and second bearing points described above. Further, the decreased radius of the second spool 312 provides for a configuration of the first spool 312 and motor 300 that can fit with in an interior of the door 16.

Figure 14:
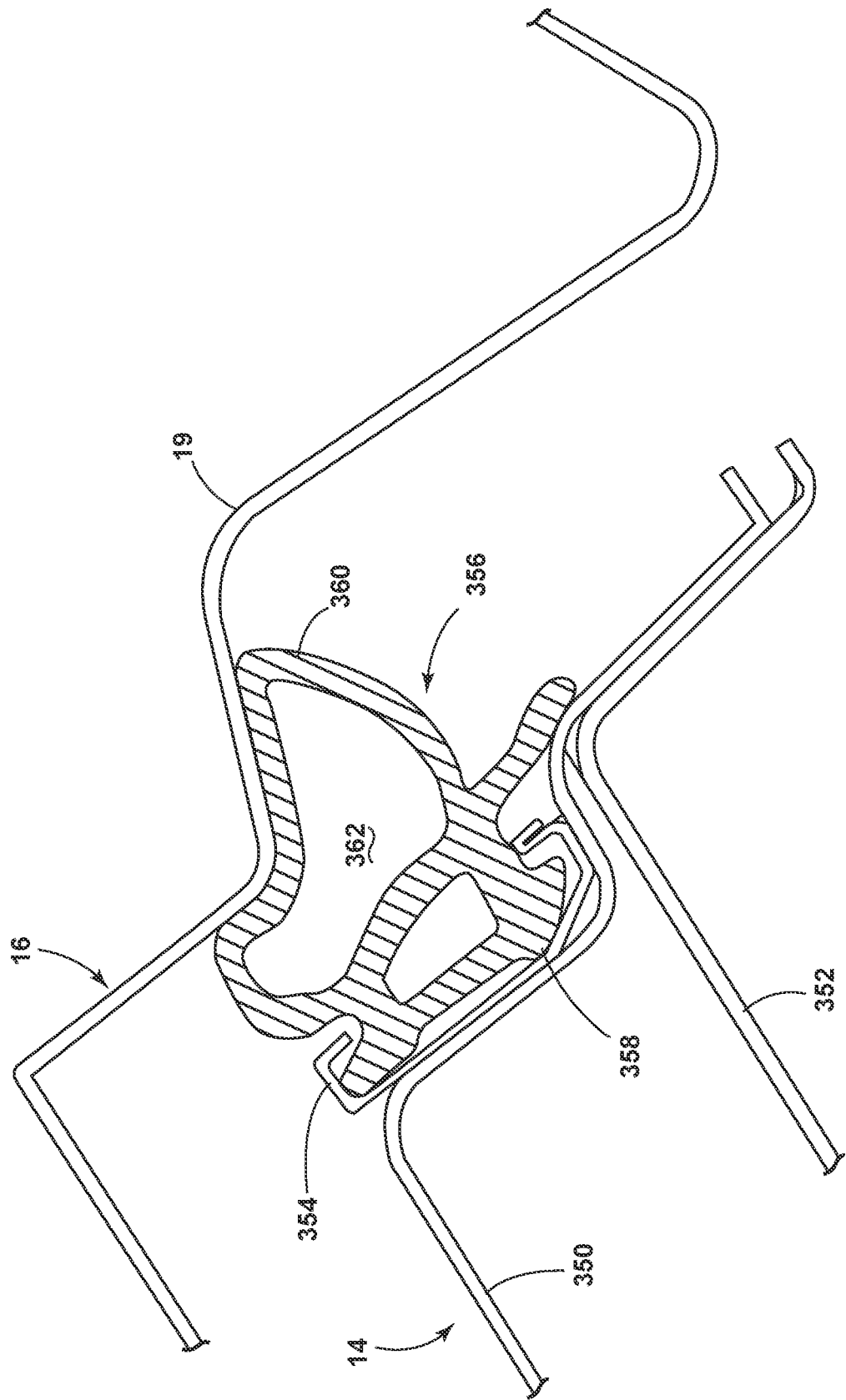
FIG. 14 is a top plan view of a vehicle door and a vehicle body having a seal disposed therebetween.

Referring now to FIG. 14, a portion of the vehicle body 14 is shown having panels 350, 352. The vehicle door 16 is shown having inner panel 19. As shown in FIG. 14, panel 350 includes a C-shaped channel 354 which is configured to engage a seal 356 at a mounting portion 358 thereof. The seal 356 shown in FIG. 14 may be considered a primary seal which extends substantially around the entirety of a door opening. The door 16, as shown in FIG. 14, is considered to be in a closed position with a seal portion 360 of the seal 356 sealed against the vehicle door 16. The seal portion 360 is a bulb type portion having a hollow interior 362. In this way, the seal portion 360 of the seal 356 can be compressed and sealed tightly against the door 16 to reduce air and wind noise when the door 16 is closed against the vehicle body 14. The mounting portion 358 of the seal 356 is shown disposed within the C-shaped channel 354 of the vehicle body 14. If this mounting portion 358 is not fully entrapped by the C-shaped channel 354, then air noise may be experienced by a vehicle occupant. As shown in FIG. 14, the mounting portion 358 and the seal portion 360 are a continuous unitary member such that if a more robust mounting portion 358 is used to better entrap the seal 356 in the C-shaped channel 354 of the vehicle body 14, then the seal portion 360 will also be a hardened or more robust seal portion which can make closing the vehicle door 16 more difficult. With the power assist device 10 or 10A described above, the closing of the vehicle door 16 can be assisted, such that a more robust seal 356 can be used even though such a seal may surround the entire opening for a vehicle door. It is further contemplated that other seals, beyond the primary seal, are used to seal out exterior elements and reduce wind noise when the vehicle door 16 is closed against the vehicle body 14. With the power assist device 10 or 10A, the other seals used to properly seal the vehicle door 16 may also be of a more robust nature, thereby providing a sure coupling to either the vehicle body 14 or the vehicle door 16, while still allowing for proper closing of the door 16 to the vehicle body 14 with a more robust seal portion 360 of the seal 356 disposed therebetween.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method of moving a vehicle door, comprising the steps of:
    providing a door pivotally coupled to a vehicle body;
    transmitting a door movement signal to a controller, wherein the door movement signal to includes one of a door closing signal, a door opening signal, and a door detent signal;
    identifying a current position of the door using a position sensor to sense the current position of the door and determining if the door is in a proper position for closing if a door closing signal is transmitted to the controller, and opening the door to a second position from the current position when closing from the current position would exceed a predetermined torque threshold;
    moving the door using a power assist device mounted to an inner panel of the door and coupled to the vehicle body; and
    monitoring a position of the door while closing.

2. The method of claim 1, wherein the step of moving the door using a power assist device further includes, moving the door to one of an open position, a closed position and a predetermined detent position in response to the door movement signal received by the controller.

3. The method of claim 2, wherein the step of moving the door to the closed position further includes, latching the door to the vehicle body using a latch mechanism when the door is in a closed position.

* * * * *